US011691277B2

(12) United States Patent
Nagarajan et al.

(10) Patent No.: US 11,691,277 B2
(45) Date of Patent: Jul. 4, 2023

(54) GRASPING OF AN OBJECT BY A ROBOT BASED ON GRASP STRATEGY DETERMINED USING MACHINE LEARNING MODEL(S)

(71) Applicant: X Development LLC, Mountain View, CA (US)

(72) Inventors: Umashankar Nagarajan, Santa Clara, CA (US); Bianca Homberg, Mountain View, CA (US)

(73) Assignee: X DEVELOPMENT LLC, Mountain View, CA (US)

( * ) Notice: Subject to any disclaimer, the term of this patent is extended or adjusted under 35 U.S.C. 154(b) by 4 days.

(21) Appl. No.: 17/379,091

(22) Filed: Jul. 19, 2021

(65) Prior Publication Data

US 2021/0347040 A1 Nov. 11, 2021

Related U.S. Application Data

(63) Continuation of application No. 15/862,514, filed on Jan. 4, 2018, now Pat. No. 11,097,418.

(51) Int. Cl.
*G05B 19/04* (2006.01)
*B25J 9/16* (2006.01)
*G05B 19/418* (2006.01)

(52) U.S. Cl.
CPC ............ *B25J 9/163* (2013.01); *B25J 9/1612* (2013.01); *B25J 9/1697* (2013.01);
(Continued)

(58) Field of Classification Search
CPC ........ B25J 9/163; B25J 9/1612; B25J 9/1697; G05B 19/41885; G05B 2219/40411; Y10S 901/03; Y10S 901/09; Y10S 901/47
See application file for complete search history.

(56) References Cited

U.S. PATENT DOCUMENTS 6,650,965 B2 11/2003 Takagi et al.
6,718,231 B2 4/2004 Konno et al.
(Continued)

FOREIGN PATENT DOCUMENTS

CN 107000208 8/2017

OTHER PUBLICATIONS

Aydemir, A. et al. (May 2011). Search in the real world: Active visual object search based on spatial relations. In Robotics and Automation (ICRA), 2011 IEEE International Conference on (pp. 2818-2824). IEEE.
(Continued)

*Primary Examiner* — Harry Y Oh
*Assistant Examiner* — Sohana Tanju Khayer
(74) *Attorney, Agent, or Firm* — Gray Ice Higdon

(57) ABSTRACT

Grasping of an object, by an end effector of a robot, based on a grasp strategy that is selected using one or more machine learning models. The grasp strategy utilized for a given grasp is one of a plurality of candidate grasp strategies. Each candidate grasp strategy defines a different group of one or more values that influence performance of a grasp attempt in a manner that is unique relative to the other grasp strategies. For example, value(s) of a grasp strategy can define a grasp direction for grasping the object (e.g., "top", "side"), a grasp type for grasping the object (e.g., "pinch", "power"), grasp force applied in grasping the object, pre-grasp manipulations to be performed on the object, and/or post-grasp manipulations to be performed on the object.

17 Claims, 13 Drawing Sheets

(52) U.S. Cl.
CPC .............. *G05B 19/41885* (2013.01); *G05B 2219/40411* (2013.01); *Y10S 901/03* (2013.01); *Y10S 901/09* (2013.01); *Y10S 901/47* (2013.01)

(56) References Cited

U.S. PATENT DOCUMENTS

| | | | |
|---|---|---|---|
| 6,889,118 | B2 | 5/2005 | Murray et al. |
| 6,952,629 | B2 | 10/2005 | Takamura et al. |
| 7,299,110 | B2 | 11/2007 | Gupta et al. |
| 7,620,477 | B2 | 11/2009 | Bruemmer |
| 7,668,621 | B2 | 2/2010 | Bruemmer |
| 9,669,543 | B1* | 6/2017 | Stubbs .................. B25J 9/1612 |
| 9,754,490 | B2 | 9/2017 | Kentley et al. |
| 9,873,199 | B2 | 1/2018 | Wellman et al. |
| 9,914,213 | B2 | 3/2018 | Vijayanarasimhan et al. |
| 10,207,402 | B2 | 2/2019 | Levine et al. |
| 10,754,318 | B2 | 8/2020 | Nagarajan |
| 11,097,418 | B2 | 8/2021 | Nagarajan |
| 2013/0184860 | A1 | 7/2013 | Ota et al. |
| 2016/0101519 | A1* | 4/2016 | Kopicki .................. B25J 9/1697 700/254 |
| 2016/0167228 | A1 | 6/2016 | Wellman |
| 2016/0221187 | A1* | 8/2016 | Bradski .................. B25J 9/1694 |
| 2016/0243701 | A1 | 8/2016 | Gildert et al. |
| 2016/0297068 | A1 | 10/2016 | Thibodeau et al. |
| 2017/0024877 | A1 | 1/2017 | Versace et al. |
| 2017/0252924 | A1* | 9/2017 | Vijayanarasimhan ...................... G05B 19/18 |
| 2017/0305014 | A1 | 10/2017 | Gildert |
| 2018/0364731 | A1* | 12/2018 | Liu .................. G06V 10/40 |
| 2019/0001489 | A1 | 1/2019 | Hudson et al. |
| 2019/0005374 | A1 | 1/2019 | Shankar et al. |
| 2019/0084151 | A1 | 3/2019 | Bai et al. |
| 2019/0196436 | A1 | 6/2019 | Nagarajan |
| 2019/0247662 | A1 | 8/2019 | Poltroak |
| 2019/0337152 | A1 | 11/2019 | Homberg et al. |
| 2019/0361672 | A1* | 11/2019 | Odhner .................. B25J 19/021 |
| 2020/0094405 | A1* | 3/2020 | Davidson .............. B25J 9/1697 |
| 2020/0114506 | A1 | 4/2020 | Toshev et al. |

OTHER PUBLICATIONS

Mittendorfer et al., A General Tactile Approach for Grasping Unknown Objects with a Humanoid Robot, 2013, IEEE, p. 4747-4752.

Cleveland et al., Automated System for Semantic Object Labeling With Soft-Object Recognition and Dynamic Programming Segmentation, 2016, IEEE, p. 820-833.

Cleveland et al., An Automated System for Semantic Object Labeling With Soft-Object Recognition and Dynamic Programming Segmentation, 2015, IEEE, p. 683-690.

Mason et al., An object-based semantic worid model for long-term change detection and semantic querying, 2012, IEEE, p. 38513858.

Chandarr et al., "A Novel Multi Modal Tracking Method Based On Depth and Semantic Color Features for Human Robot Interatction;" IEEE; p. 369-372; 2015.

Worgotter et al., "A Simple Ontology of Manipulation Actions Based on Hand-Object Relations;" IEEE, p. 117-134; 2013.

Stiefelhagen et al., "Enabling Multimodal Human-Robot Interaction for the Karlsruhe Humanoid Robot;" IEEE, p. 840-851; 2007.

Bucher, M. et al. "Improving semantic embedding consistency by metric learning for zero-shot classification." European Conference on Computer Vision. Springer International Publishing, 2016; 17 pages.

Cai, et al. "Understanding Hand-Object Manipulation with Grasp Types and Object Attributes." Robotics: Science and Systems. 2016; 10 pages.

Dang, et al. "Semantic grasping: Planning robotic grasps functionally suitable for an object manipulation task." Intelligent Robots and Systems (IROS), 2012 IEEE/RSJ International Conference on. IEEE, 2012; 7 pages.

Dang et al. "Semantic grasping: planning task-specific stable robotic grasps." Autonomous Robots 37.3 (2014): 301-316.

Frome, Andrea, et al. "Devise: A deep visual-semantic embedding model." Advances in neural information processing systems. 2013; 11 pages.

Jang, E. et al. "End-to-End Learning of Semantic Grasping." arXiv preprint arXiv:1707.01932 (2017); 14 pages.

Jin, L. et al. "Object Detection Free Instance Segmentation With Labeling Transformations." arXiv preprint arXiv:1611.08991 (2016); 10 pages.

Kappler, D. et al. "Representation of pre-grasp strategies for object manipulation." Humanoid Robots (Humanoids), 2010 10th IEEE-RAS International Conference on. IEEE, 2010; 8 pages.

Kehoe et al. "Cloud-Based Robot Grasping with the Google Object Recognition Engine." Robotics and Automation (ICRA), 2013 IEEE International Conference on IEEE, 2013. 7 pages.

Lenz, I. et al.; Deep Learning for Detecting Robotic Grasps; The International Journal of Robotics Research; 17 Pages; dated 2015.

Mahler et al. "Dex-net 1.0: A Cloud-Based Network Of 3D Objects For Robust Grasp Planning Using A Multi-Armed Bandit Model With Correlated Rewards." In Robotics and Automation (ICRA), 2016 IEEE International Conference, pp. 1957-1964.

Movshovitz-Attias, Yair, et al. "No Fuss Distance Metric Learning using Proxies." arXiv preprint arXiv:1703.07464 (2017); 9 pages.

Redmon, Joseph, and Anelia Angelova. "Real-Time Grasp Detection Using Convolutional Neural Networks." arXiv preprint arXiv:1412.3128 (2014).

Romero, J., et al. "Human-to-robot mapping of grasps." Proceedings of IEEE/RSJ International Conference on ntelligent Robots and Systems, WS on Grasp and Task Learning by Imitation. 2008; 8 pages.

Sandouk, U., et al. "Multi-label zero-shot learning via concept embedding." arXiv preprint arXiv:1606.00282 (2016); 15 pages.

Spiers, A., et al. "Single-Grasp Object Classification and Feature Extraction with Simple Robot Hands and Tactile Sensors." IEEE transactions on haptics 9.2 (2016): 207-220.

Szegedy, C. et al. "Deep Neural Networks For Object Detection." In Advances in Neural Information Processing Systems, pp. 2553-2561. 2013.

Toshev, A. et al. "Shape representations for object recognition." A Dissertation in Computer and Information Science; University of Pennsylvania; 2011; 195 pages.

Tsoli, A., et al. "Neighborhood denoising for learning high-dimensional grasping manifolds." Intelligent Robots and Systems, 2008. IROS 2008. IEEE/RSJ International Conference on. IEEE, 2008; 6 pages.

Tsoli, A., et al. "Sparse Control of Robot Grasping from 2D Subspaces." Proceedings of the 28th Annual International Conf of the IEEE 'Engineering in Medicine and Biology Society (EMBS'06). 2006; 6 pages.

Wang, Z. et al. "Robot grasp detection using multimodal deep convolutional neural networks." Advances in Mechanical Engineering 8.9 (2016): XP055511783, ISSN: 1687-8140, DOI: 10.1177/1687814016668077; 12 pages.

Zhang, L. et al. "Grasp evaluation with graspable feature matching." RSS Workshop on Mobile Manipulation Learning to Manipulate. 2011; 6 pages.

Zhang, X. et al. "Learning Spread-out Local Feature Descriptors." arXiv preprint arXiv: 1708.06320 (2017); 9 pages.

Okun, O. et al. "Supervised Locally Linear Embedding Algorithm;" Proceedings of the 10th Finnish Artificial Intelligence Conference (Step-2002), pp. 50-61; Dec. 15, 2002.

Alpaydin, E. "Introduction to Machine Learning" Second Edition, Chapter 6 "Dimensionality Reduction," The MIT Press pp. 109-142 dated 2010.

De Ridder, D. et al. "Supervised Locally Linear Embedding;" Proc. Int. Conf. Adv. Biometrics (ICB); [Lecture Notes in Computer Science] vol. 2714; pp. 333-341; Jan. 1, 2003.

Roweis, S. et al. "Nonlinear Dimensionality Reduction by Locally Linear Embedding;" American Association for the Advancement of Science, vol. 290, No. 5500; pp. 2323-2326; Dec. 22, 2000.

(56) References Cited

OTHER PUBLICATIONS

Levine et al.; Learning Hand-Eye Cordination for Robotic Grasping with Deep Learning and Large-Scale Data Collection; International Journal of Robotics Research; vol. 37, No. 4-5; pp. 421-436; dated Jun. 12, 2017.

European Patent Office; International Search Report and Written Opinion of Ser. No. PCT/US2019/012147; 15 pages dated May 20, 2019.

Barck-Holst, C. et al. "Learning grasping affordance using probabilistic and ontological approaches." Advanced Robotics, 2009. ICAR 2009 International Conference on IEEE; 6 pages; (2009).

Herzog, A. et al. "Template-based learning of grasp selection." In Robotics and Automation (ICRA), IEEE International Conference on IEEE; pp. 2379-2384; (2012).

Huebner, K. et al. "Grasping known objects with humanoid robots: A box-based approach." Advanced Robotics, 2009. ICAR 2009. International Conference on. IEEE; 6 pages; (2009).

Nguyen, A. et al. "Detecting object affordances with convolutional neural networks." Intelligent Robots and Systems (IROS), 2016 IEEE/RSJ International Conference on. IEEE; 7 pages; (2016).

Redmon, J. et al. "Real-Time Grasp Detection Using Convolutional Neural Networks." arXiv:1412.3128v2 [cs.RO]; 7 pages; dated Feb. 28, 2015.

Song, D. et al. "Learning task constraints for robot grasping using graphical models." Intelligent Robots and Systems (IROS), 2010 IEEE/RSJ International Conference on. IEEE; 8 pages; (2010).

Song, H. et al. "Visual grasp affordances from appearance-based cues." Computer Vision Workshops (ICCV Workshops), 2011 IEEE International Conference on. IEEE; 10 pages; (2011).

Stückler, J. et al. "Efficient 3D object perception and grasp planning for mobile manipulation in domestic environments." Robotics and Autonomous Systems 61.10; pp. 1106-1115; (2013).

European Patent Office; Communication pursuant to Article 94(3) issued in Application No. 19704061.1, 7 pages, dated Mar. 21, 2022.

Sergey Levine et al., Learning hand-eye coordination for robotic grasping with deep learning and large-scale data collection, vol. 37, No. 4-5, pp. 421-436, XP055566656, US ISSN: 0278-3649, DOI: 10.1177/0278364917710318; dated Jun. 12, 2017.

China National Intellectual Property Administration; First Office Action issued in Application No. 201980016060.3; 25 pages; dated Jan. 28, 2023.

* cited by examiner

500

```
┌─────────────────────────────────────────────────────────────────────────┐
│ RECEIVE GROUP OF 3D DATA POINTS GENERATED BY A VISION COMPONENT OF A ROBOT, │
│ AND CAPTURING ENVIRONMENTAL OBJECT 552                                  │
└─────────────────────────────────────────────────────────────────────────┘
                                    ↓
┌─────────────────────────────────────────────────────────────────────────┐
│ APPLY VISION DATA AS INPUT TO TRAINED MACHINE LEARNING MODEL, THE VISION DATA │
│ BASED ON THE GROUP OF 3D DATA POINTS, OR GENERATED BY AN ADDITIONAL VISION │
│ COMPONENT OF THE ROBOT 554                                              │
└─────────────────────────────────────────────────────────────────────────┘
                                    ↓
┌─────────────────────────────────────────────────────────────────────────┐
│ PROCESS THE VISION DATA USING THE TRAINED MACHINE LEARNING MODEL TO GENERATE │
│ OUTPUT DEFINING GRASP REGION AND CORRESPONDING SEMANTIC INDICATION 556  │
└─────────────────────────────────────────────────────────────────────────┘
                                    ↓
┌─────────────────────────────────────────────────────────────────────────┐
│ SELECT, FROM A PLURALITY OF CANDIDATE GRASP STRATEGIES AND BASED ON THE │
│ SEMANTIC INDICATION, A PARTICULAR GRASP STRATEGY 558                    │
└─────────────────────────────────────────────────────────────────────────┘
                                    ↓
┌─────────────────────────────────────────────────────────────────────────┐
│ DETERMINE AN END EFFECTOR POSE FOR INTERACTING WITH THE OBJECT TO GRASP THE │
│ OBJECT BASED ON: THE GROUP OF 3D POINTS, THE GRASP REGION, AND THE PARTICULAR │
│ GRASP STRATEGY 560                                                      │
│  ┌───────────────────────────────────────────────────────────────────┐  │
│  │ SELECT PARTICULAR 3D POINT(S) WITHIN THE GRASP REGION 560A        │  │
│  └───────────────────────────────────────────────────────────────────┘  │
│                                    ↓                                    │
│  ┌───────────────────────────────────────────────────────────────────┐  │
│  │ DETERMINE SURFACE NORMAL(S) BASED ON THE PARTICULAR 3D POINT(S) 560B │  │
│  └───────────────────────────────────────────────────────────────────┘  │
│                                    ↓                                    │
│  ┌───────────────────────────────────────────────────────────────────┐  │
│  │ DETERMINE END EFFECTOR POSE BASED ON SURFACE NORMAL(S) 560C       │  │
│  └───────────────────────────────────────────────────────────────────┘  │
└─────────────────────────────────────────────────────────────────────────┘
                                    ↓
┌─────────────────────────────────────────────────────────────────────────┐
│ PROVIDE COMMANDS THAT CAUSE THE END EFFECTOR OF THE ROBOT TO TRAVERSE TO THE │
│ END EFFECTOR POSE IN ASSOCIATION WITH ATTEMPTING A GRASP OF THE OBJECT 562 │
└─────────────────────────────────────────────────────────────────────────┘
                                    ↓
┌ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┐
│ STORE THE END EFFECTOR POSE AND THE VISION DATA AND/OR THE GROUP OF 3D POINTS │
│ 564                                                                     │
└ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┘
                                    ↓
┌ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┐
│ TRAIN ADDITIONAL MACHINE LEARNING MODEL(S) BASED ON STORED INSTANCES OF END │
│ EFFECTOR POSE AND VISION DATA AND/OR GROUP OF 3D POINTS 566             │
└ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┘
```

FIG. 5

GRASPING OF AN OBJECT BY A ROBOT BASED ON GRASP STRATEGY DETERMINED USING MACHINE LEARNING MODEL(S)

BACKGROUND

Many robots are programmed to utilize one or more end effectors to grasp one or more objects. For example, a robot may utilize a grasping end effector such as an "impactive" grasping end effector (e.g., jaws, claws, fingers, and/or bars that grasp an object by direct contact upon the object) or "ingressive" grasping end effector (e.g., physically penetrating an object using pins, needles, etc.) to pick up an object from a first location, move the object to a second location, and drop off the object at the second location. Some additional examples of robot end effectors that may grasp objects include "astrictive" grasping end effectors (e.g., using suction or vacuum to pick up an object) and one or more "contigutive" grasping end effectors (e.g., using surface tension, freezing or adhesive to pick up an object), to name just a few. While humans innately know how to correctly grasp many different objects, determining an appropriate manner to grasp an object for manipulation of that object may be a difficult task for robots.

SUMMARY

This specification is directed to methods and apparatus related to grasping of an object, by an end effector of a robot, based on a grasp strategy that is selected using one or more machine learning models. The grasp strategy utilized for a given grasp is one of a plurality of candidate grasp strategies. Each candidate grasp strategy defines a different group of one or more values that influence performance of a grasp attempt in a manner that is unique relative to the other grasp strategies. For example, value(s) of a grasp strategy can influence one or more poses of the end effector of a robot in attempting a grasp, such as a grasp pose (e.g., a full six-dimensional pose) of the end effector prior to (e.g., immediately prior to) an attempted grasp utilizing the end effector. For instance, value(s) of a grasp strategy can dictate whether a grasp is performed from a "top" direction (relative to the object to be grasped), a "side" direction, or other direction (e.g., between "top" and "side"), which will influence the grasp pose of the end effector prior to an attempted grasp. Also, for example, value(s) of a grasp strategy can additionally or alternatively influence whether manipulation(s) are performed on an object prior to and/or after grasping the object, and can influence which manipulation(s) are performed (if any). For instance, value(s) can dictate that an object (e.g., a large plate) is to first be slid to the edge of a surface prior to attempting a "side" grasp of the object. As yet another example, value(s) of a grasp strategy can additionally or alternatively influence parameters of the actual grasp itself, such as an amount of force that is applied in grasping and/or whether the grasp is a fingertip/pinch grasp, a power grasp, a raking grasp, or other available (e.g., in view of grasp types achievable by the end effector) type of grasp.

Some implementations described herein process sensor data (e.g., vision data), using a trained machine learning model, to generate output that defines one or more grasp regions and, for each of the one or more grasp regions, a corresponding semantic indication associated with the grasp region. The sensor data is generated by one or more sensors of a robot, and captures features of an object to be grasped by the robot (and optionally captures features of additional environmental object(s)). For example, the sensor data can include vision data that is generated by a vision component of a robot, and that captures an object to be grasped by the robot. Each grasp region generated using the trained machine learning model indicates a corresponding portion of the sensor data and defines, directly or indirectly, a corresponding spatial region for interacting with an object to grasp the object. For example, a grasp region can define a plurality of pixels in vision data that is a two-dimensional (2D) image, and those pixels can be mapped to corresponding points in three-dimensional space that define a spatial region for interacting with an object to grasp the object. The semantic indication associated with a grasp region can indicate one or more values for a grasp strategy, such as a grasp direction (e.g., top, side) and/or grasp type (e.g., pinch, power). Those implementations further select a grasp strategy based on the semantic indication, and determine an end effector pose, for interacting with the object to grasp the object, based on the grasp strategy and one of the grasp regions. For example, the selected grasp strategy can include a grasp direction and/or grasp type selected based on the semantic indication, and the end effector pose can be a grasp pose determined based on the grasp direction and/or grasp type, and the grasp region. A robot is then controlled to cause an end effector of the robot to traverse to the end effector pose in association with attempting a grasp of an object.

As one particular example, the vision data can be a two-dimensional (2D) image generated by a vision component of a robot and can be processed over a trained machine learning model to generate one or more grasp regions and corresponding semantic indications. For instance, each grasp region can indicate a bounding rectangle (or other bounding shape) that encapsulates one or more contiguous pixels of the 2D image. Also, for instance, the corresponding semantic indications can each indicate a grasp direction for the grasp (e.g., side, top, etc.). At least one grasp region can be selected based on it corresponding to an object to be grasped. For example, a given grasp region can be selected based in it corresponding to a region having a classification that corresponds to an object to be grasped, where the classification of the region is based on output generated over a separate object detection and classification machine learning model. Further, one or more particular three-dimensional (3D) points can be selected, from a group of 3D points, based on the 3D point(s) corresponding to the pixel(s) encapsulated by the selected grasp region. The group of 3D points can be generated by the same vision component that generated the 2D image (e.g., the 2D image can be the same as the 3D points, except for lacking a depth channel) or can be generated by an additional vision component (e.g., the 2D image can be generated by a camera and the 3D points can be a point cloud from a separate laser scanner) and mapped to the pixels of the 2D image. A surface normal can be determined for each of one or more of the selected 3D point(s), and an end effector approach vector determined based on one or more of the surface normal(s). The end effector approach vector can have a direction component that is opposite from one of the surface normals, but otherwise strictly conforms to that surface normal. In some implementations, the grasp direction indicated by the semantic indication (e.g., top, side) can be utilized to select a surface normal utilized in determining the approach vector. For example, if a "top" grasp is to be performed, a surface normal that extends "up" can be selected in lieu of one that extends to the "side" or "down". In this manner, the grasp direction that defines at least part of the grasp strategy is utilized in determining the approach vector (and resultantly the grasp pose determined based on the approach vector). An end effector grasp pose that conforms to the end effector approach vector can be determined, and one or more control commands provided to actuators of the robot to cause the end effector to traverse to the grasp pose and attempt a grasp of the object subsequent to traversing to the grasp pose. Additionally, in some implementations multiple grasp poses can be considered for each of one or more end effector approach vectors, and one grasp pose selected based on it avoiding collisions (with the object and/or with other objects in the environment), satisfying inverse kinematic constraints, and/or based on other criterion/criteria.

Although the preceding particular example is described with respect to semantic indications that indicate a grasp direction, the machine learning model can be trained to provide additional and/or alternative semantic indications that can influence a grasp strategy. For example, the semantic indications can additionally and/or alternatively include semantic indications that influence manipulation(s) that are performed on an object prior to and/or after grasping the object (e.g., "slide" after grasping, "slide" to an edge of a surface before grasping) and/or can include indications that influence parameters of the actual grasp itself (e.g., an amount of force that is applied in grasping, a type of grasp).

Additionally, in some implementations, other value(s) of a grasp strategy can be determined based at least in part on outputs generated utilizing one or more additional machine learning models. For example, some of those implementations process vision data using an object detection and classification model, to generate a semantic indication that includes a classification of the object to be grasped, and optionally classification(s) of one or more additional objects in the environment. Such classification(s) can additionally or alternatively be utilized in determining one or more values for a grasp strategy. For example, a classification of an object to be grasped can be assigned, in a database, to a value that dictates an amount of force to be applied in grasping—and such value utilized as part of a grasp strategy to dictate the amount of force that is to be applied in grasping the object. As yet another example, assume a trained "grasp regions and semantic indications" model is utilized to determine a grasp region and a semantic indication that indicates a "side" grasp direction—and that a grasp pose is determined based on the grasp region and the semantic indication as described above. Further assume that a separate object detection and classification model is utilized to determine the object to be grasped is a "plate". In such an example, the "side" grasp direction and the "plate" classification can be collectively mapped, in a database, to a pre-grasp manipulation of "slide to the edge of the supporting surface". Based on such mapping, the pre-grasp manipulation of sliding the plate to the edge of the supporting surface can first be performed prior to attempting a grasp. As yet a further example, assume a trained "grasp regions and semantic indications" model is utilized to determine a grasp region and a semantic indication that indicates a "side" grasp direction—and that a grasp pose is determined based on the grasp region and the semantic indication as described above. Further assume that a separate object detection and classification model is utilized to determine the object to be grasped is a "chair". In such an example, the "side" grasp direction and the "chair" classification can be collectively mapped, in a database, to a post-grasp manipulation of "slide prior to lifting". Based on such mapping, the post-grasp manipulation of sliding the chair can be performed after a successful grasp of the chair, and prior to lifting the chair off of the ground.

Some implementations described herein select a grasp strategy for a grasp attempt independent of output from a "grasp regions and semantic indications model". For example, some of those implementations process vision data using an object detection and classification model, to generate a semantic indication that includes a classification of the object to be grasped, and optionally classification(s) of one or more additional objects in the environment. The classification(s) are then utilized in selecting a grasp strategy. For example, a "small plate" classification (e.g., a plate with a width less than a maximum grasping width) can be assigned, in a database, to a value that dictates a "top grasp" is to be performed. As another example, a "large plate" classification (e.g., a plate with a width greater than a maximum grasping width) can be assigned, in a database, to a value that dictates a "side grasp" is to be performed following a pre-grasp manipulation of "slide to the edge of the supporting surface". As yet another example, a "chair" classification of an object to be grasped can be assigned, in a database, to a value that dictates a post-grasp manipulation of "slide prior to lifting" when a "table" classification is also determined for another environmental object near the "chair" object; whereas such a post-grasp manipulation is not dictated when the "table" classification is not also determined for any environmental object near the "chair" object.

As another example of implementations that select a grasp strategy for a grasp attempt independent of output from a "grasp regions and semantic indications model", classification(s) and other contextual data (e.g., a location, a task being performed, etc.) can be processed using a machine learning model trained to predict a grasp strategy, and the predicted grasp strategy utilized in attempting a grasp of an object. For instance, a classification of an object to be grasped can be applied as input to the trained machine learning model, optionally along with classification(s) of other environmental object(s) and/or other contextual data. The input can be processed using the trained machine learning model to generate output that indicates a predicted grasp strategy, and a corresponding grasp strategy selected based on the output.

The preceding is provided as an example of various implementations described herein. Additional description of those implementations, and of additional implementations, are provided in more detail below, and in the detailed description.

In some implementations, a method is provided that includes applying sensor data as input to at least one trained machine learning model. The sensor data is generated by one or more sensor components of a robot and captures features of an object in an environment of the robot. The method further includes processing the sensor data using the at least one trained machine learning model to generate output defining a spatial region for interacting with the object to grasp the object, and defining a semantic indication associated with the object. The method further includes selecting, based on the semantic indication, a particular grasp strategy of plurality of candidate grasp strategies. The method further includes determining an end effector pose, for interacting with the object to grasp the object, based on the spatial region defined by the output and based on the particular grasp strategy selected based on the semantic indication defined by the output. The method further includes providing, to actuators of the robot, commands that cause an end effector of the robot to traverse to the end effector pose in association with attempting a grasp of the object.

These and other implementations of the technology disclosed herein can include one or more of the following features.

In some implementations, the particular grasp strategy includes a grasp approach direction for approaching the object in attempting the grasp of the object, and determining the end effector pose is based on the grasp approach direction. In some of those implementations, the particular grasp strategy further includes an initial manipulation to perform on the object, prior to attempting the grasp of the object, and the method further includes: providing, to the actuators of the robot, further commands that cause the end effector of the robot to perform the initial manipulation on the object in association with attempting the grasp of the object. In some versions of those implementations, the initial manipulation includes sliding the object across a surface on which the object rests in the environment.

In some implementations, the particular grasp strategy includes a degree of force to apply in attempting the grasp of the object and/or a grasp type to be performed by the end effector.

In some implementations, the output is generated over a single model of the at least one trained machine learning model, and defines the at least one spatial region, and defines the semantic indication for the at least one spatial region. In some of those implementations, the sensor data processed using the single model includes vision data generated by a vision component of the one or more sensor components, where the vision data lacks a depth channel. In some versions of those implementations, determining the end effector pose includes: selecting at least one particular three-dimensional (3D) point, from a group of 3D points, based on the particular 3D point being within the spatial region; and determining the at least one end effector pose based on the at least one particular 3D point. The group of 3D points includes a depth channel, and the group of 3D points is generated by the vision component, or is generated by an additional vision component of the robot that is viewing the environment. For example, the group of 3D points can be generated by the vision component, and the vision data processed using the single model can include the group of 3D points without the depth channel. Determining the end effector pose based on the at least one particular 3D point can, in some implementations, include determining an approach vector based on a surface normal determined based on the at least one particular 3D point, and determining the end effector pose based on the surface normal. Selecting the at least one particular 3D point can be further based on the surface normal conforming to a grasp approach direction of the grasp strategy.

In some implementations, the semantic indication associated with the object that is defined by the output includes a classification of the object, and selecting the particular grasp strategy is based on the particular grasp strategy being stored in association with the classification of the object. In some of those implementations, the output generated by processing the vision data using the at least one trained machine learning model further includes an additional classification associated with an additional object in the environment, and selecting the particular grasp strategy is based on the particular grasp strategy being stored in association with both: the classification of the object and the additional classification of the additional object.

In some implementations, a method is provided that includes receiving a group of three-dimensional (3D) data points generated by a vision component of a robot, where the group of 3D data points capture an object in an environment of a robot. The method further includes applying vision data as input to at least one trained machine learning model and processing the vision data using the trained machine learning model to generate output defining one or more grasp regions and, for each of the one or more grasp regions, a corresponding semantic indication. The vision data captures the object in the environment of the robot and is based on the group of 3D data points, or is generated by an additional vision component of the robot. The method further includes selecting a grasp region, of the one or more grasp regions, based on the grasp region corresponding to the object and the object being selected for grasping. The method further includes selecting, based on the semantic indication of the grasp region, a particular grasp strategy of a plurality of candidate grasp strategies. The method further includes determining an end effector pose, for interacting with the object to grasp the object, based on: the group of 3D points, the grasp region, and the particular grasp strategy. The method further includes providing, to actuators of the robot, commands that cause an end effector of the robot to traverse to the end effector pose in association with attempting a grasp of the object.

These and other implementations of the technology disclosed herein can include one or more of the following features.

In some implementations, determining the end effector pose includes: selecting at least one particular 3D point from the group of 3D points based on the particular 3D point being within the grasp region; and determining the at least one end effector pose based on a surface normal determined based on the at least one particular 3D point. In some of those implementations, determining the at least one end effector pose based on the surface normal determined based on the at least one particular 3D point is based on the surface normal conforming to a grasp approach direction defined by the particular grasp strategy.

In some implementations, the vision data processed using the trained machine learning model to generate the output includes two-dimensional (2D) vision data.

In some implementations, a method is provided that includes applying vision data as input to trained object classification machine learning model, and processing the vision data using the trained object classification machine learning model to generate output indicating a semantic classification of the object. The vision data is generated by a vision component of a robot and captures an object in an environment of the robot. The method further includes selecting, from a plurality of candidate grasp strategies and based on the semantic classification, a particular grasp strategy. The method further includes controlling an end effector of the robot to cause the end effector to interact with the object in accordance with the particular grasp strategy, in attempting a grasp of the object.

These and other implementations of the technology disclosed herein can include one or more of the following features.

In some implementations, the output generated based on processing the vision data using the trained object classification machine learning model further indicates an additional semantic classification of an additional object in the environment of the robot, and selecting the particular grasp strategy is further based on the additional semantic classification. In some of those implementations, selecting the particular grasp strategy based on the semantic classification and the additional semantic classification includes: applying the semantic classification and the additional semantic classification as additional input to an additional trained machine learning model; processing the input using the additional machine learning model to generate additional output that indicates the grasp strategy; and selecting the grasp strategy based on it being indicated by the additional output. In some versions of those implementations, the additional output includes a probability for the grasp strategy and additional probabilities for additional grasp strategies, and the additional output indicates the grasp strategy based on the probability for the grasp strategy satisfying a threshold.

Other implementations may include a non-transitory computer readable storage medium storing instructions executable by a processor (e.g., a central processing unit (CPU) or graphics processing unit (GPU)) to perform a method such as one or more of the methods described herein. Yet another implementation may include a system of one or more computers and/or one or more robots that include one or more processors operable to execute stored instructions to perform a method such as one or more (e.g., all) aspects of one or more of the methods described herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

BRIEF DESCRIPTION OF THE DRAWINGS

FIG. 5 is a flowchart illustrating an example method of providing control commands to cause an end effector to traverse to an end effector pose determined based on a selected grasp strategy.

DETAILED DESCRIPTION

Figure 1:
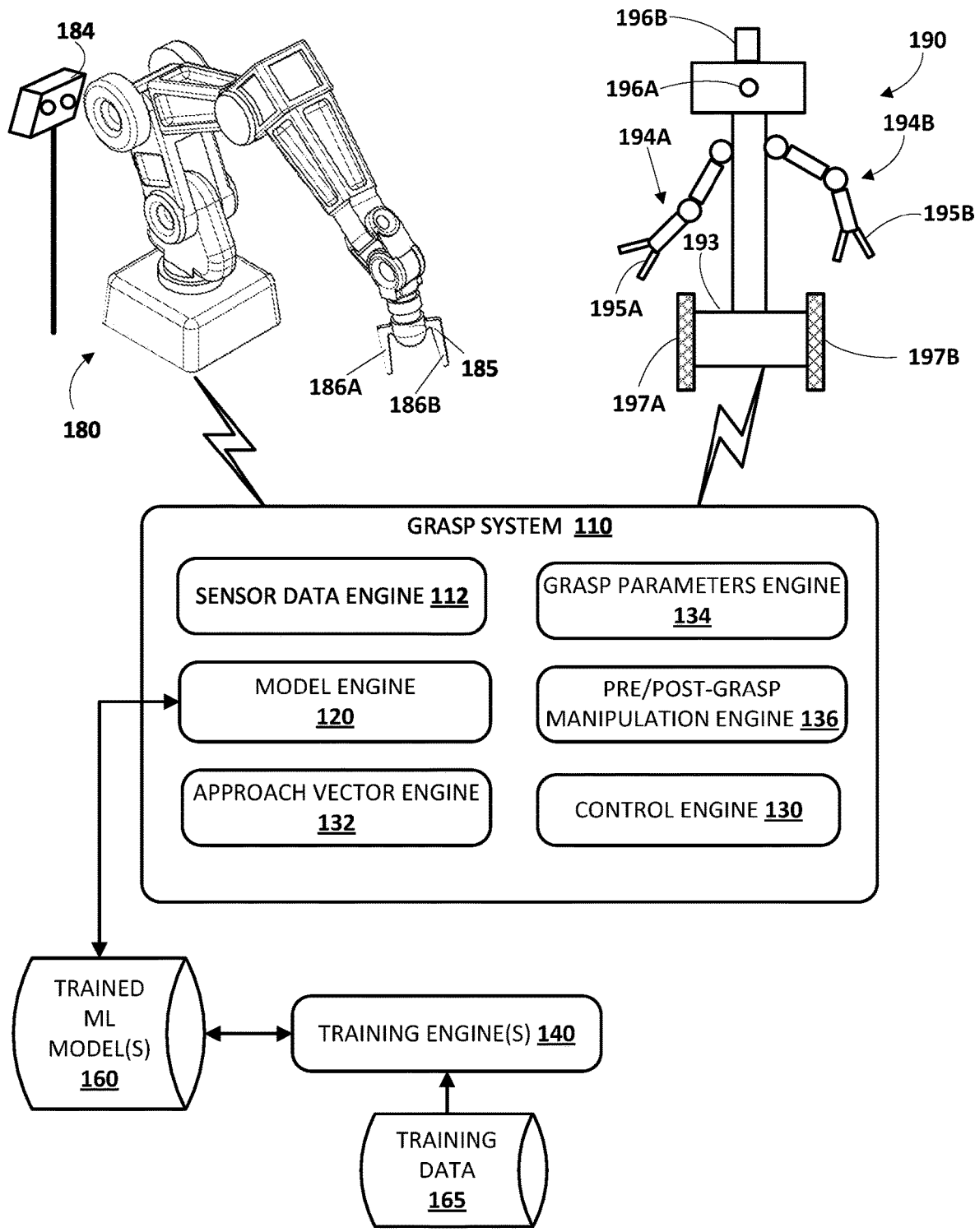
FIG. 1 illustrates an example environment in which an object can be grasped, by an end effector of a robot, based on a grasp strategy that is selected using one or more trained machine learning models.

FIG. 1 illustrates an example environment in which an object can be grasped by an end effector of a robot (e.g., robot 180, robot 190, and/or other robots). The object can be grasped in accordance with a grasp strategy that is selected by a grasp system 110 using one or more trained machine learning models 160. For example, the grasp system 110 can: select the grasp strategy based on processing of sensor data from a robot using one or more trained machine learning models 160; determine, based on the selected grasp strategy, one or more end effector poses, grasp parameters, and/or pre-grasp and/or post-grasp manipulations for attempting a grasp of an object; and can provide commands to actuators of the robot to cause an end effector of the robot to attempt the grasp of the object based on the determined end effector poses, grasp parameters, and/or pre-grasp and/or post-grasp manipulations.

Example robots 180 and 190 are illustrated in FIG. 1. Robot 180 is a "robot arm" having multiple degrees of freedom to enable traversal of a grasping end effector 185 of the robot 180 along any of a plurality of potential paths to position the grasping end effector 185 in any one of a plurality of desired poses. As used herein, a pose of an end effector references a full six-dimensional ("6D") pose of the end effector that specifies both a position and an orientation of the end effector. In some implementations, the position of the end effector may be the position of a reference point of the end effector. In some implementations, the reference point of an end effector may be a center of mass of the end effector, and/or a point near where end effector attaches to other components of the robot, though this is not required.

The pose of an end effector may be defined in various manners, such as in joint space and/or in Cartesian/configuration space. A joint space pose of an end effector may be a vector of values that define the states of each of the operational components that dictate the position of the end effector. A Cartesian space pose of an end effector may utilize coordinates or other values that define all six degrees of freedom of the end effector relative to a reference frame. It is noted that some robots may have kinematic redundancy and that more than one joint space pose of an end effector may map to the same Cartesian space pose of the end effector in those robots.

Robot 180 further controls two opposed actuable members 186A and 186B of the end effector 185 to actuate the actuable members 186A and 186B between at least an open position and a closed position (and/or optionally a plurality of "partially closed" positions). As described herein, robot 180 may operate semi-autonomously at least part of the time and control operational components thereof to attempt a grasp of an object in accordance with a grasp strategy selected by grasp system 110. As also described herein, the grasp strategy selected by grasp system 110 is selected based on output generated based on processing of sensor data, from sensor(s) of a corresponding robot, using one or more trained machine learning models 160. As used herein, an "operational component" of a robot may refer to actuators such as motors (e.g., servo motors), gear trains, pumps (e.g., air or liquid), pistons, drives, and/or other components that may create and/or undergo propulsion, rotation, and/or motion. Some operational components may be independently controllable, although this is not required. In some instances, the more operational components robot 180 has, the more degrees of freedom of movement it may have.

Stereographic camera 184 is also illustrated in FIG. 1. In some implementations, a stereographic camera includes two or more sensors (e.g., charge-coupled devices (CCDs)), each at a different vantage point and each generating image data. Each of the two sensors generates image data and the image data from each sensor at a given instance may be utilized to generate a two-dimensional ("2D") image at the given instance. Moreover, based on image data generated by the two sensors, three-dimensional ("3D") vision data may also be generated in the form of an image with a "depth" channel, where each of the points of the 3D vision data defines a 3D coordinate of a surface of a corresponding object. For example, a 3D point may be determined to be the intersection point of a first ray from a first pixel of a first image generated by one of the sensors at a given instance and a second ray from a corresponding second pixel of a second image generated by the other sensor at or near the given instance (where the rays "project" from the images based on "known" geometries between the images (e.g., the known baseline and angles between the two sensors)). In some other implementations, a stereographic camera may include only a single sensor and one or more mirrors utilized to effectively capture image data from two different vantage points. In various implementations, a stereographic camera may be a projected-texture stereo camera. For example, the stereographic camera may be a projected-texture stereo camera that also includes a projector that projects a pattern in infrared and senses the projected pattern (e.g., the sensed pattern may be included in image data generated by one or more sensors of the camera). The sensed pattern may also be utilized in generating the 3D vision data.

In FIG. 1, stereographic camera 184 is mounted at a fixed pose relative to the base or other stationary reference point of robot 180. The stereographic camera 184 has a field of view of at least a portion of the workspace of the robot 180, such as the portion of the workspace that is near grasping end effector 185. Although a particular mounting of stereographic camera 184 is illustrated in FIG. 1, additional and/or alternative mountings may be utilized. For example, in some implementations, stereographic camera 184 may be mounted directly to robot 180, such as on a non-actuable component of the robot 180 or on an actuable component of the robot 180 (e.g., on the end effector 185 or on a component close to the end effector 185). Also, for example, in some implementations, the stereographic camera 184 may be mounted on a non-stationary structure that is separate from the robot 180 and/or may be mounted in a non-stationary manner on a structure that is separate from robot 180.

The robot 190 includes robot arms 194A and 194B with corresponding end effectors 195A and 195B, that each take the form of a gripper with two opposing actuable members. The robot 190 also includes a base 193 with wheels 197A and 197B provided on opposed sides thereof for locomotion of the robot 190. The base 193 may include, for example, one or more motors for driving corresponding wheels 197A and 197B to achieve a desired direction, velocity, and/or acceleration of movement for the robot 190.

The robot 190 also includes a monographic camera 196A and a 3D laser scanner 196B. A monographic camera captures image data and the image data at a given instance may be utilized to generate a two-dimensional ("2D") image at the given instance. A 3D laser scanner includes one or more lasers that emit light and one or more sensors that generate sensor data related to reflections of the emitted light. The generated sensor data from a 3D laser scanner may be utilized to generate a 3D point cloud, where each of the 3D points of the 3D point cloud defines a 3D coordinate of a surface of a corresponding object. A 3D laser scanner may be, for example, a time-of-flight 3D laser scanner or a triangulation based 3D laser scanner and may include a position sensitive detector (PSD) or other optical position sensor.

As described herein, robot 190 may operate semi-autonomously at least part of the time and control operational components thereof to grasp objects based on a grasp strategy selected by grasp system 110. For example, the robot 190 may control the wheels 197A and/or 197B, the robot arms 194A and/or 194B, and/or the end effectors 195A and/or 195B to grasp objects in accordance with a grasp strategy selected by grasp system 110.

Although particular robots 180 and 190 are illustrated in FIG. 1, additional and/or alternative robots may be utilized, including robots having other robot arm forms, robots having a humanoid form, robots having an animal form, robots that move via one or more wheels (e.g., self-balancing robots), submersible vehicle robots, an unmanned aerial vehicle ("UAV"), and so forth. Also, although particular grasping end effectors are illustrated in FIG. 1, additional and/or alternative end effectors may be utilized, such as alternative impactive grasping end effectors (e.g., those with grasping "plates", those with more or fewer "digits"/ "claws"), "ingressive" grasping end effectors, "astrictive" grasping end effectors, or "contigutive" grasping end effectors, or non-grasping end effectors.

Turning now to the grasp system 110 of FIG. 1, it is illustrated as separate from, but in communication with, both of robots 180 and 190. In some implementations, all or aspects of grasp system 110 may be implemented on robot 180 and/or robot 190 (e.g., via one or more processors of robots 180 and 190). For example, robots 180 and 190 may each include an instance of the grasp system 110. In some implementations, all or aspects of grasp system 110 may be implemented on one or more computer systems that are separate from, but in network communication with, robots 180 and/or 190. Moreover, in some of those implementations, each of the robots 180 and 190 may have their own dedicated instance of the grasp system 110.

The sensor data engine 112 of grasp system 110 receives instance(s) of sensor data, from sensor(s) of a robot, and provides the instance(s) to one or more other components of the grasp system 110, for use in selecting a grasp strategy and/or in determining how to perform a grasp attempt in accordance with a selected grasp strategy. In some implementations, the sensor data includes vision data, such as 2D vision data and/or 3D vision data. 2D vision data can include 2D images generated based on image data captured by camera(s) associated with a robot, and each of the 2D images can include a plurality of pixels and values defined for each of one or more channels of each of the pixels. For example, a 2D image can include a plurality of pixels each having red, green, and blue channels and may define, for each of the channels for each of the pixels, a value (e.g., from 0 to 255). 3D vision data, as used herein, can include so-called 2.5D images that include a depth channel (in addition to one or more color channels) and/or can include 3D point cloud data that includes X, Y, and Z position values of detected surfaces (optionally with "intensity" values).

As one particular example of sensor data that can be received by sensor data engine 112, the sensor data can include a 2D image generated based on image data from one of the sensors of the stereographic camera 184 of the robot 180, and/or can include 3D vision data that is a 2.5D image generated based on image data from two sensors of the stereographic camera 184. As another example, the sensor data can include a 2D image generated based on image data from the monographic camera 196A of the robot 190, and 3D point cloud data generated based on data from the laser scanner 196B of robot 190. Although vision data is described in the particular examples of this paragraph, non-vision sensor data can additionally or alternatively be received and provided to one or more other components of the grasp system 110, such as sensor data from one or more acoustic sensors, sensor data from one or more tactile sensors, etc.

In some implementations, the sensor data engine 112 optionally preprocesses sensor data prior to providing it to one or more other components of the grasp system 110. For example, the sensor data engine 112 can crop a 2D image, resize a 2D image, alter colors in a 2D image, etc. For instance, the sensor data engine 112 can resize a 2D image to size it for input dimensions of one or more of the trained machine learning models 160 to be used by the model engine 120. Also, for instance, the sensor data engine 112 can preprocess a 2D image to "crop in" or "crop out" certain objects (e.g., to keep in only a target object to be grasped).

The model engine 120 processes sensor data, provided by sensor data engine 112, using one or more trained machine learning models 160, to generate output that is utilized to select a grasp strategy for grasping of an object. The output can define a semantic indication associated with an object, and the grasp strategy can be selected, based on the semantic indication, from a plurality of candidate grasp strategies. Each candidate grasp strategy defines a different group of one or more values that influence performance of a grasp attempt in a manner that is unique relative to the other grasp strategies. For example, value(s) of a grasp strategy can influence one or more poses of the end effector of a robot in attempting a grasp, can influence whether (and which) manipulation(s) are performed on an object prior to and/or after grasping the object, and/or can influence parameters of the actual grasp itself. The output can also define a spatial region for interacting with an object to grasp the object. The spatial region can be utilized, for example, by the approach vector engine 132 in determining an approach vector and/or grasp pose for grasping of an object.

The trained machine learning models 160 can each be trained by a corresponding one of training engine(s) 140, based on corresponding training data 165 that is tailored to the trained machine learning model. The training data 165 can include, for example, supervised and/or semi-supervised training data, such as training data described herein. Additional description is provided herein (e.g., in description of FIGS. 2-9) of: the model engine 120, examples of trained machine learning models 160 that can be utilized by the model engine 120, examples of training such models, selection of grasp strategies based on output generated over the trained machine learning models 160, and of executing grasp attempts in accordance with selected grasp strategies.

The approach vector engine 132 generates an end effector approach vector for an attempted grasp of an object. The approach vector engine 132 can generate the approach vector based on sensor data provided by sensor data engine 112, based on a spatial region determined by the model engine 120, and/or based on a grasp strategy determined by the model engine 120. Further, the approach vector engine 132 can generate an end effector grasp pose that conforms to the end effector approach vector.

Figure 10:
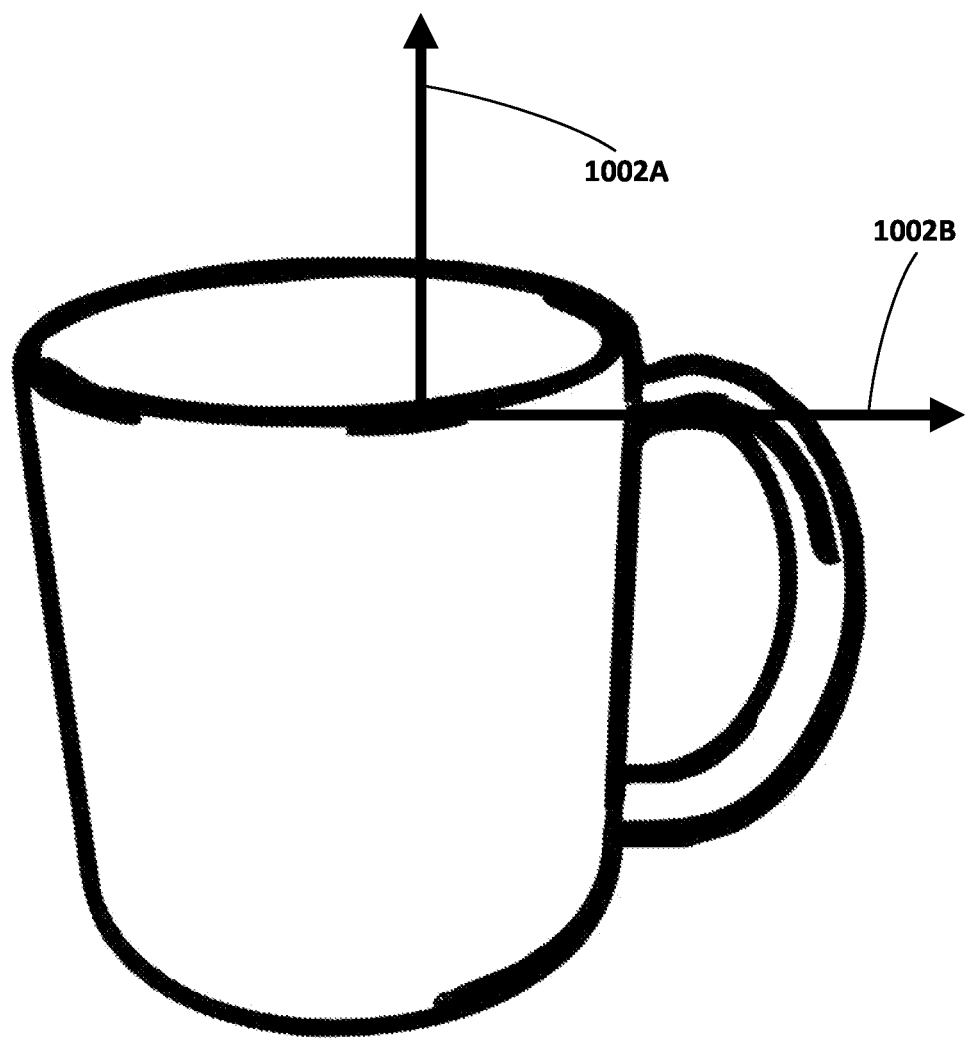
FIG. 10 illustrates some surface normals that can be determined based on 3D data points for a coffee mug.

In some implementations, the approach vector engine 132 generates the end effector approach vector based on a spatial region determined by the model engine 120, based on the spatial region corresponding to an object to be grasped. The spatial region can be, for example, a grasp region defined by output from a "grasp regions and semantic indications model" as described herein, or a spatial region defined by an object detection and classification model as described herein. In some of those implementations, the approach vector engine 132 selects one or more particular 3D points, from a group of 3D points of 3D vision data, based on the 3D point(s) corresponding to the pixel(s) encapsulated by the spatial region. Further, the approach vector engine 132 determines a surface normal for each of one or more of the selected 3D point(s), and determines an end effector approach vector based on one or more of the surface normal(s). The end effector approach vector can have a direction component that is opposite from one of the surface normals, but otherwise strictly conforms to that surface normal. In some implementations, the approach vector engine 132 utilizes a grasp direction (e.g., top, side) of a selected grasp strategy to select a surface normal utilized in determining the approach vector. For example, if a "top" grasp is to be performed, a surface normal that extends "up" can be selected in lieu of one that extends to the "side" or "down". As one example, and referring to FIG. 10, a first surface normal 1002A and a second surface normal 1002B can both be determined based on separate 3D points, of 3D vision data, of a spatial region of a coffee mug. If a "top" grasp is to be performed, first surface normal 1002A can be selected in lieu of surface normal 1002B, as surface normal 1002A extends in a "top" direction, whereas surface normal 1002B extends in a "side" direction. Additionally, in some implementations multiple grasp poses can be considered for each of one or more end effector approach vectors, and one grasp pose selected based on it avoiding collisions (with the object and/or with other objects in the environment), satisfying inverse kinematic constraints, and/or based on other criterion/criteria.

Referring again to FIG. 1, the group of 3D points that can be considered by the approach vector engine 132 include 3D points that capture at least a portion of the surface of the object to be grasped—and are selected based on a mapping (direct or indirect) between the spatial region determined by the model engine 120 and the group 3D points. For example, the spatial region can be a bounding rectangle or other bounding area that encompasses pixel(s) of a 2D image, and the approach vector engine can select a group of 3D points that map to the encompassed pixels. The approach vector engine 132 can utilize various techniques to determine which particular 3D point(s) are mapped to pixel(s) of a 2D image. For example, in some implementations the 2D image can be a first image of a stereographic camera of a robot (e.g., stereographic camera 184). In some of those implementations, the first image and a second image from the stereographic camera that is captured at a different vantage point (e.g., another image from another sensor of the stereographic camera) may be utilized to determine the 3D points. For example, a 3D point may be determined to be the intersection point of a first ray from a first pixel of the first image and a second ray from a corresponding second pixel of the second image (where the rays "project" from the images based on "known" geometries between the images (e.g., the known geometries between two cameras of a stereographic camera)). Accordingly, in implementations in which a 2D image is a first image from a stereographic camera of a robot, each pixel of that image may be directly mapped to a corresponding 3D point based on a ray from that pixel being utilized to calculate the 3D point. In those implementations, the approach vector engine 132 can utilize the direct mappings between pixels and 3D points to determine particular 3D point(s) that map to selected pixel(s).

As another example, in some implementations a 2D may be an image from a camera (stereo or mono) of a robot (e.g., monographic camera 196A) and the 3D points may be generated based on a laser scanner (e.g., laser scanner 196B) or other 3D scanner (e.g., a separate stereo camera). The 2D image from the camera and the 3D points may optionally be generated based on corresponding sensor data generated at or near the same time. The poses of the camera and the 3D scanner may be known and those poses utilized to determine direct mappings between pixels of a 2D image captured by the camera and 3D points generated by the 3D scanner. In those implementations, the approach vector engine 132 may utilize the direct mappings between pixels and 3D points to determine particular 3D point(s) that map to selected pixel(s).

Figure 11:
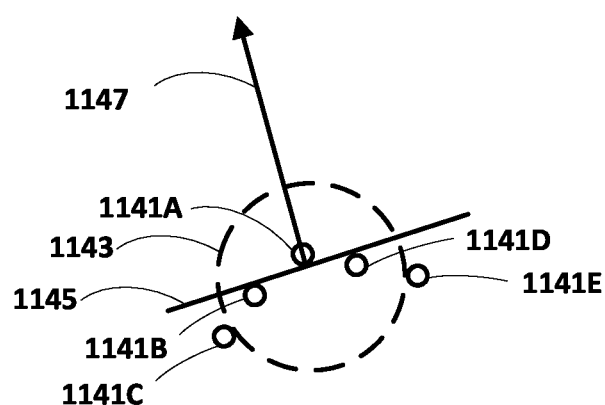
FIG. 11 illustrates an example of generating a grasp approach vector based on a surface normal determined based on a local plane for a 3D point.

As described above, the approach vector engine 132 determines a grasp approach vector based on one or more surface normal(s) of one or more particular 3D points of the group of 3D points. Various techniques can be utilized to determine the surface normals of the 3D points, and to determine a grasp approach vector based on one or more of the surface normals. One particular example of determining a grasp approach vector is provided with reference to FIG. 11. FIG. 11 illustrates some 3D points 1141A-E of a 3D point cloud that captures at least a portion of the surface of an object. It is understood that the 3D point cloud contains many additional points than those illustrated in FIG. 11. Further, it is noted that FIG. 11 illustrates positions of the 3D points 1141A-E in only two dimensions and that each of the 3D points 1141A-E have a position in another dimension (one that extends "into" and "out of" FIG. 11) that may vary from the positions of other of the 3D points 1141A-E in that dimension. In other words, the 3D points are not all necessarily coplanar with one another.

In FIG. 11, a surface normal 1147 of 3D point 1141A is illustrated and can be determined based on a local plane 1145 that can be generated based on the 3D point 1141A and based on one or more additional 3D points, such as additional 3D points 1141B and 1141D that are in a neighborhood 1143 of the 3D point 1141A. The neighborhood 1143 can extend in all three dimensions and can encompass additional 3D points not illustrated in FIG. 11B. The neighborhood 1143 may vary in other implementations (e.g., it may have a different shape), and may optionally be determined based on various factors, such as density of the 3D point cloud. The approach vector engine 132 can utilize one or more techniques to fit the local plane 1145, such as least squares fitting and/or principal component analysis (PCA). The surface normal 1147 is a normal of the local plane 1145. The approach vector engine 132 can determine a grasp approach vector based on the surface normal. For instance, the approach vector engine 132 can determine a grasp approach vector to be a vector that is in an opposite direction from the surface normal 1147, but otherwise strictly conforms to the surface normal 1147. As described herein, in some implementations the approach vector engine 132 can determine the grasp approach vector based on the surface normal 1147, based at least in part on determining that the surface normal 1147 is in a direction that conforms to a grasp direction (e.g., top, side) defined by a selected grasp strategy.

The approach vector engine 132 can further generate one or more candidate grasp poses of an end effector based on the grasp approach vector and/or other constraints. For example, the approach vector engine 132 can employ a collision checker to generate multiple candidate grasp poses that each conform to the grasp approach vector (e.g., with a rotational axis of the end effector aligned with the approach vector) and that do not collide with the object to be grasped and/or with other object(s) in the environment with the object to be grasped. The approach vector engine 132 can optionally utilize a model of the grasping end effector and/or of other components of the robot to determine conformance to a grasp approach vector and may utilize the model(s) and the 3D vision data to determine whether the end effector and/or other components of the robot collide with object(s) in the environment. One of the candidate grasp poses may then be selected as a grasp pose of an end effector for utilization by a robot in attempting a grasp with the grasping end effector. As described herein, the grasp pose defines a pose (position and orientation/full 6D pose) of an end effector of the robot prior to (e.g., immediately prior to) an attempted grasp utilizing the grasping end effector.

Referring again to FIG. 1, the grasp parameters engine 134 can optionally determine one or more parameters of an actual grasp to be attempted, such as an amount of force that is applied in grasping and/or whether the grasp is a fingertip/pinch grasp, a power grasp, a raking grasp, or other available type of grasp. The grasp parameters engine 134 can determine such parameters based on the parameters being defined by a grasp strategy selected by the model engine 120.

The pre/post-grasp manipulation engine 136 can optionally determine whether manipulation(s) are performed on an object prior to and/or after grasping the object, and can influence which manipulation(s) are performed (if any). The pre/post-grasp manipulation engine 136 can make such a determination based on a grasp strategy selected by the model engine 120.

The control engine 130 generates and provides control commands to actuators of a robot that cause an end effector of the robot to attempt a grasp of the object based on determination(s) made by the approach vector engine 132, the grasp parameters engine 134, and/or the pre/post-grasp manipulation engine 130—where such determinations are in accordance with a selected grasp strategy. For example, the control engine 130 can provide control commands to attempt the grasp of the object based on an end effector grasp pose determined by engine 132 based on an end effector approach vector. For instance, the control engine 130 can provide control commands to actuators of the robot to cause the end effector to traverse to the grasp pose and attempt a grasp of the object subsequent to traversing to the grasp pose. The grasp can be attempted by, for example, moving actuable components of a grasping end effector toward one another to attempt a grasp. For instance, to attempt a grasp using the robot 180, actuable members 186A and 186B can be moved toward one another until they are either at a fully closed position or a torque reading or other reading measured by torque or other force sensor(s) associated with the members satisfies a threshold.

In implementations where a selected grasp strategy also defines grasp parameters (e.g., a grasp type and/or force of a grasp), the control engine 130 can further provide control commands that cause the attempted grasp of the object to be performed using the grasp parameters determined by the grasp parameters engine 134. Further, in implementations where a selected grasp strategy also defines pre and/or post-grasp manipulations, the control engine 130 can further provide control commands that cause the object to be manipulated, prior to and/or following the attempted grasp, based on pre and/or post-grasp manipulations determined by the pre/post-grasp manipulation engine 136.

Figure 2A:
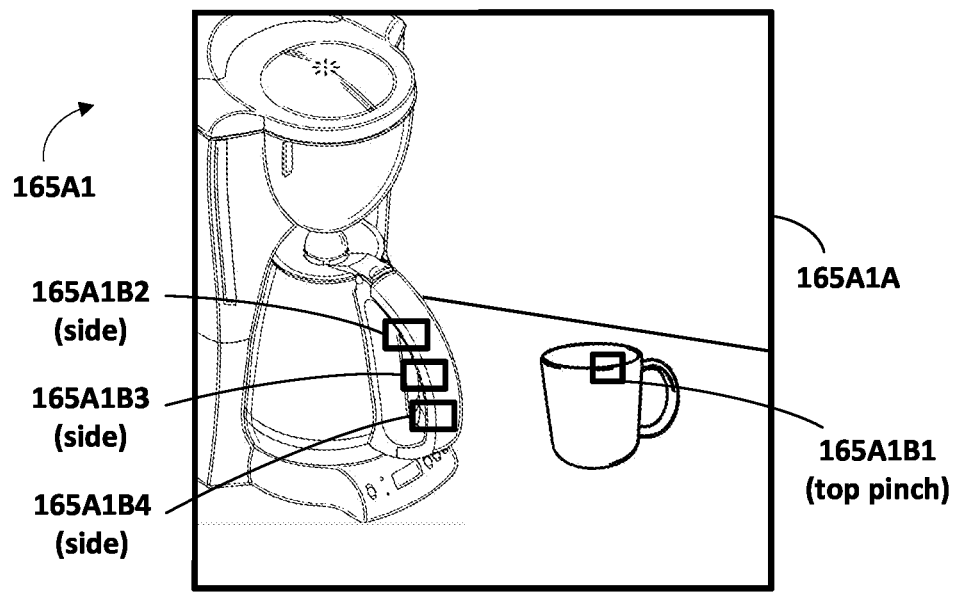
FIG. 2A illustrates an example of a training instance that can be utilized to train a grasp regions and semantic indications model, of the trained machine learning models of FIG. 1.
Figure 2B:
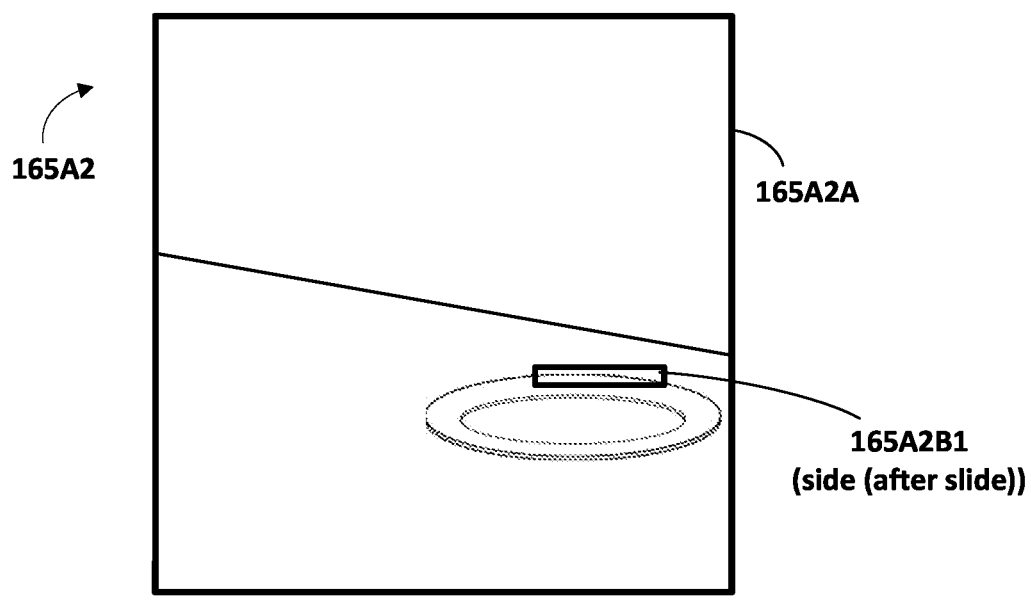
FIG. 2B illustrates another example of a training instance that can be utilized to train the grasp regions and semantic indications model, of the trained machine learning models of FIG. 1.

Turning now to FIGS. 2A, 2B, 3, 4, and 5, implementations are described of training and utilizing a "grasp regions and semantic indications model" of trained machine learning models 160 of FIG. 1. FIGS. 2A and 2B each illustrates an example of a training instance, of training data 165, that can be utilized by one of the training engine(s) 140 to train a grasp regions and semantic indications model 160A. The training instances of FIGS. 2A and 2B can be generated, for example, in a supervised manner based on user interface input from human(s).

FIG. 2A illustrates a training instance 165A1 that includes training instance input of a 2D image 165A1A that includes a coffee mug and a coffee pot. The training instance 165A1 further includes training instance output that includes a plurality of grasp regions with corresponding semantic indications 165A1B1, 165A1B2, 165A1B3, and 165A1B4. In particular, 165A1B1 illustrates a bounding area that encompasses a plurality of pixels of the image 165A1A and that has a semantic indication corresponding to "top pinch" (i.e., indicating a "top" grasping direction and a "pinch" grasp type). In other words, 165A1B1 indicates an area of the coffee mug, for interacting with the coffee mug for grasping the coffee mug, and indicates a grasping direction and grasping type for the grasping. Further, 165A1B2, 165A1B3, and 165A1B4 each illustrate a corresponding bounding area that encompasses a corresponding plurality of pixels of the image 165A1A and that has a semantic indication corresponding to "side" (i.e., indicating a "side" grasping direction). In other words, 165A1B2, 165A1B3, and 165A1B4 each indicate an area of the coffee pot, for interacting with the coffee pot for grasping the coffee pot, and indicates a grasping direction for the grasping. It is noted that the bounding areas are illustrated on the image 165A1A in FIG. 2A for ease of illustration, but can be represented in the training instance output as a bounding shape (e.g., a center pixel and a pixel "width" and "height"; or four "corner" pixels). Further, it is noted that the semantic indications can be represented in the training instance output as indications whose semantic meanings are not readily understood by a human (e.g., "top pinch" can be represented as "1", "side" as "2", "side power" as "3", "top power" as "4", etc.).

FIG. 2B illustrates a training instance 165A2 that includes training instance input of a 2D image 165A2A that includes a plate resting on a table. The training instance 165A2 further includes training instance output that includes grasp region and corresponding semantic indication 165A2B1. In particular, 165A2B1 illustrates a bounding area that encompasses a plurality of pixels of the image 165A2A and that has a semantic indication corresponding to "side (after slide)" (i.e., indicating a "side" grasping direction after a "slide" pre-grasp manipulation). In other words, 165A2B1 indicates an area of the plate, for interacting with the plate for grasping the plate, and indicates a pre-grasp manipulation to be performed on the plate prior to the grasping. As with FIG. 2A, it is noted that the bounding areas are illustrated on the image 165A2A in FIG. 2B for ease of illustration, but can be represented in the training instance output as a bounding shape—and that that the semantic indication can be represented in the training instance output as indications whose semantic meanings are not readily understood by a human.

Figure 3:
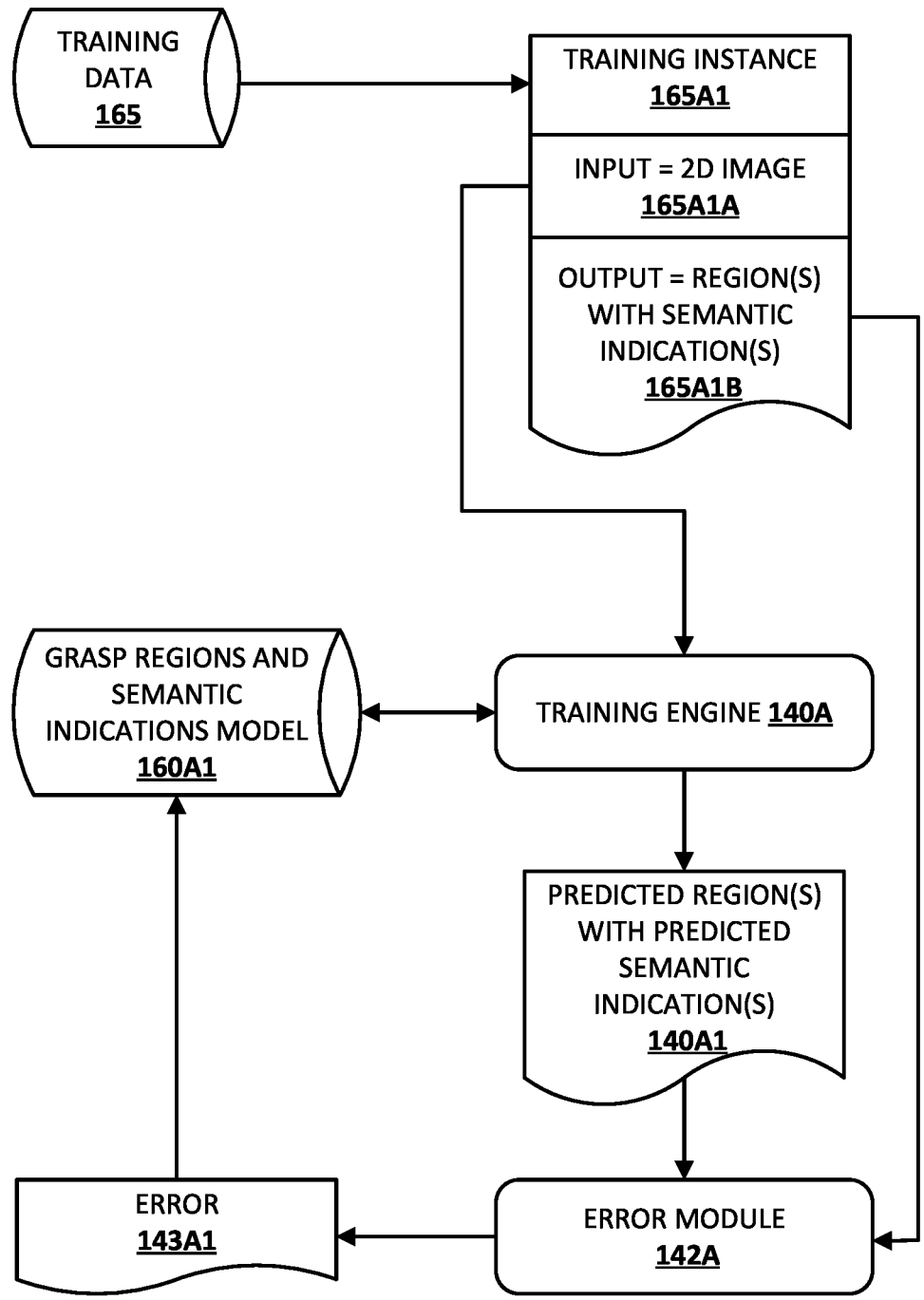
FIG. 3 illustrates an example of training the grasp regions and semantic indications model, of the trained machine learning models of FIG. 1.

FIG. 3 illustrates an example of training the grasp regions and semantic indications model 160A (FIG. 4), of the trained machine learning models 160 of FIG. 1. In FIG. 3, the grasp regions and semantic indications model is numbered with 160A1 to represent that it is being trained, whereas it is numbered with 160A in FIG. 4 to represent that is has been trained.

The grasp regions and semantic indications model 160A1 is trained utilizing a plurality of training instances of training data 165, such as training instances 165A1 and 165A2 of FIGS. 2A and 2B, and additional (e.g., thousands of) similar training instances. A single training instance 165A1 (of FIG. 2A) is illustrated in FIG. 3 and includes training instance input 165A1A of a 2D image and includes training instance output 165A1B that indicates grasp region(s) with semantic indication(s) (i.e., 165A1B1-4 of FIG. 2A). The training engine 140A applies the training instance input 165A1A as input to the grasp regions and semantic indications model 160A1, and processes the input using the model 160A1 to generate predicted regions with predicted semantic indications 140A1.

An error module 142A, of the training engine 140A, generates an error 143A1 based on comparing the predicted regions with predicted semantic indications 140A1 to the region(s) with semantic indication(s) indicated by the training instance output 165A1B. The error module 142A further updates the grasp regions and semantic indication model 160A1 based on the determined error 143A1. For example, in non-batch techniques, a gradient can be determined based on only the error 143A1, and backpropagated over the model 160A1 to update various weights of the model 160A1. Also, for example, in batch techniques, the error 143A1 can be combined with additional errors determined based on additional training instances, and utilized to update various weights of the model 160A1. Although only the training instance 165A1 is illustrated in FIG. 3, it is understood that many (e.g., thousands) of additional training instances will be utilized during training. Through training, the grasp regions and semantic indications model 160A1 is trained to enable prediction, using the model 160A1 and based on a 2D image, of grasp regions of the 2D image and corresponding semantic indications.

In various implementations, the grasp regions and semantic indications model 160A1 is a deep neural network model, such as a deep convolutional neural network (CNN) model that includes a plurality of CNN layers. In some of those implementations, the deep CNN model is pre-trained on large datasets to detect objects (and optionally classifications of those objects), and re-trained as described with respect to FIG. 3, to enable its use in predicting grasp regions and corresponding semantic indications. In some versions of those implementations, the pre-trained model can be a Faster-RCNN model, optionally adapted with one or more alternative affine layers that are tuned to predicting grasp regions and corresponding semantic indications.

Figure 4:
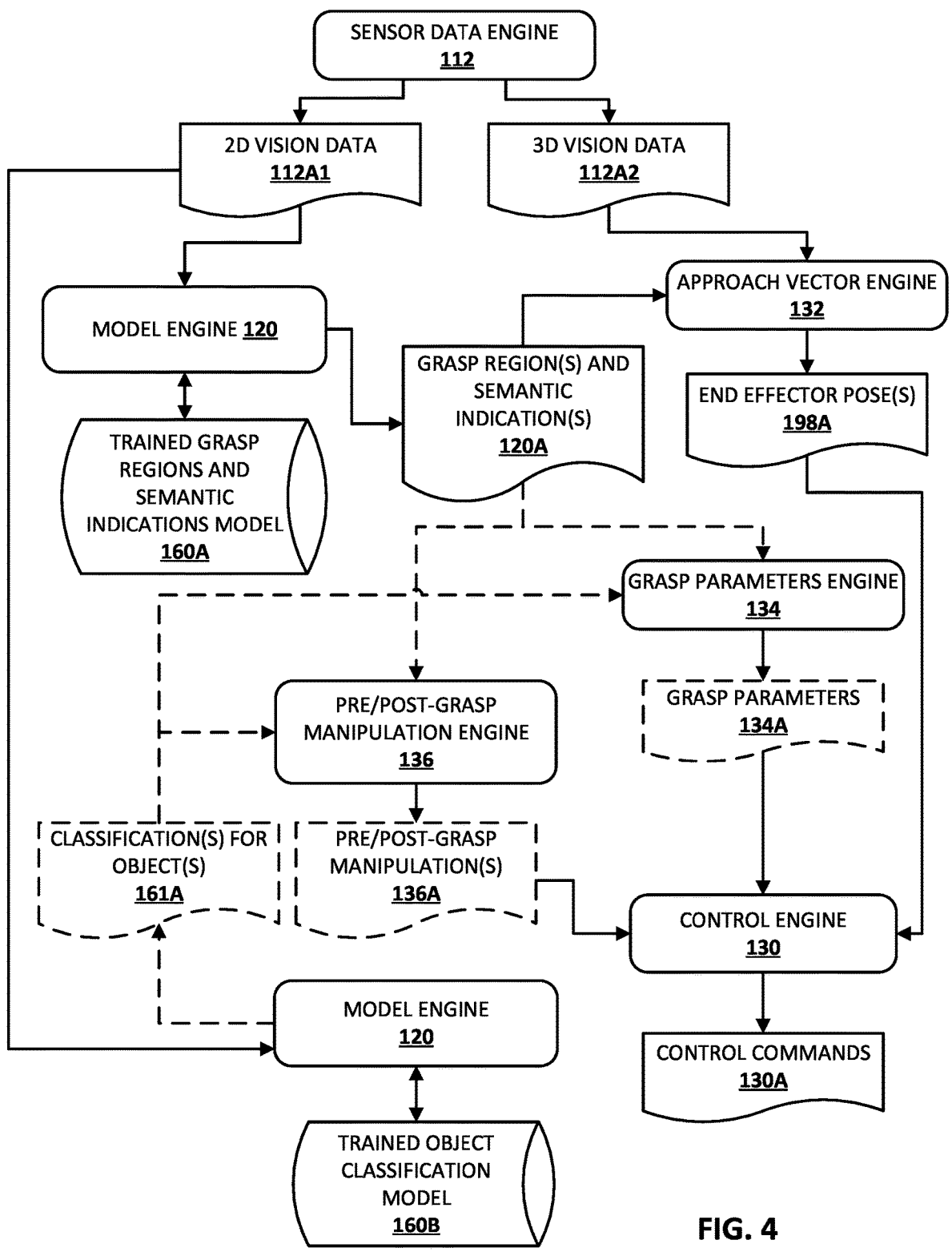
FIG. 4 illustrates an example of generating control commands to provide to an end effector for grasping, based on a grasp strategy that is selected using one or more trained machine learning models.

FIG. 4 illustrates an example of generating control commands to provide to an end effector for grasping, based on a grasp strategy that is selected using one or more trained machine learning models, including at least the trained grasp regions and semantic indications model 160A (e.g., trained as described with respect to FIG. 3).

In FIG. 4, sensor data engine 112 provides 2D vision data 112A1 (e.g., a 2D image) to model engine 120 and provides 3D vision data 112A2 to approach vector engine 132. The model engine 120 processes the 2D vision data 112A1 using the trained grasp regions and semantic indications model 160A to generate one or more grasp regions and one or more corresponding semantic indications 120A. For example, the one or more grasp regions can each indicate a plurality of pixels of the 2D vision data 112A1 and the one or more corresponding semantic indications can each indicate a corresponding grasp direction, corresponding grasp parameter(s), and/or corresponding pre-grasp and/or post-grasp manipulations.

The grasp region(s) and corresponding semantic indication(s) 120A are provided to the approach vector engine 132. The approach vector engine 132 selects at least one of the grasp regions, based on the selected grasp region corresponding to a target object to be grasped. The target object to be grasped can be based on a higher level task planner (e.g., a planner that outputs a next target object to be grasped to accomplish a robotic task) and/or based on input from a user (e.g., a verbal command of "pick up X", a gesture, a selection on a graphical interface). In some implementations, the approach vector engine 132 can determine a grasp region corresponds to a target object based on output generated using trained object classification model 160B (described below). For example, output generated using the trained object classification model 160B can indicate regions in 2D vision data that correspond to objects, and classifications for those objects, and a grasp region selected based on it overlapping with a region with a classification that corresponds to the target object.

The approach vector engine 132 generates an approach vector for a grasp, based on one or more 3D points, of a group of 3D points of the 3D vision data 112A2 that correspond to pixels of the selected grasp region. For example, the approach vector engine 132 can generate the approach vector based on the surface normal of one or more of the 3D points. In some implementations, the approach vector engine 132 utilizes a surface normal based on it corresponding to a grasp direction indicated by a semantic indication for the selected grasp region. Further, the approach vector engine 132 generates one or more end effector poses 198A based on the approach vector, such as an end effector grasp pose that conforms to the end effector approach vector and that avoids collisions and satisfies kinematic constraints.

The end effector poses(s) 198A are provided to the control engine 130, which generates control commands 130A based on the end effector pose(s) 198A, such as control commands that cause an end effector to traverse to a grasp pose of the end effector pose(s) 198, and attempt a grasp. In some implementations, the control engine 130 further generates one or more of the control commands 130A based on grasp parameters 134A generated by the grasp parameters engine 134 and/or based on pre/post-grasp manipulation(s) 136A generated by the pre/post-grasp manipulation engine 136.

In some implementations when grasp parameters 134A are generated, the grasp parameters engine 134 can generate the grasp parameters 134A based on a semantic indication, for a grasp region corresponding to the target object, of grasp region(s) and semantic indication(s) 120A. For example, the semantic indication can indicate the type of grasp and/or an amount of force to be utilized for the grasp. In some implementations when grasp parameters 134A are generated, the grasp parameters engine 134 can additionally or alternatively generate the grasp parameters 134A based on classification(s) for object(s) 161A generated by the model engine 120 utilizing the trained object classification model 160B. For example, the grasp parameters engine 134 can determine grasp parameters 134A based on them being mapped, in a database, to a classification for the target object and/or to classification(s) of other environmental object(s). The trained object classification model 160B can be a trained object detection and classification model and can be utilized, by the model engine 120, to process the 2D vision data 112A1 and generate one or more predicted classification(s) for one or more object(s), along with spatial regions indicating where the object(s) are located in the 2D vision data 112A1.

In some implementations when pre/post-grasp manipulation(s) 136A are generated, the pre/post-grasp manipulation engine 136 can generate the pre/post-grasp manipulation(s) 136A based on a semantic indication, for a grasp region corresponding to the target object, of grasp region(s) and semantic indication(s) 120A. For example, the semantic indication can indicate a pre and/or post-grasp manipulation to be performed. In some implementations when pre/post-grasp manipulation(s) 136A are generated, the pre/post-grasp manipulation engine 136 can additionally or alternatively generate the pre/post-grasp manipulation(s) 136A based on classification(s) for object(s) 161A generated by the model engine 120 utilizing the trained object classification model 160B. For example, the pre/post-grasp manipulation engine 136A can determine pre/post-grasp manipulation(s) 136A based on them being mapped, in a database, to a classification for the target object and/or to classification(s) of other environmental object(s).

Accordingly, in FIG. 4 the control engine 130 generates control commands 130A that are in accordance with a selected grasp strategy. The selected grasp strategy is selected by the model engine 120 and/or the engines 134 and/or 136 and defines a grasp direction and optionally grasp parameters and/or pre/post-grasp manipulations.

Turning now to FIG. 5, a flowchart is provided that illustrates an example method 500 of providing control commands to cause an end effector to traverse to an end effector pose determined based on a selected grasp strategy, according to various implementations disclosed herein. For convenience, the operations of the flow chart are described with reference to a system that performs the operations. This system may include one or more components, such as one or more processors (e.g., CPU(s), GPU(s), and/or TPU(s)) of a robot. While operations of method 500 are shown in a particular order, this is not meant to be limiting. One or more operations may be reordered, omitted or added.

At block 552, the system receives a group of 3D data points generated by a vision component of a robot capturing an environmental object. The vision component can be, for example, a stereographic camera or a laser scanner.

At block 554, the system applies vision data as input to a trained machine learning model. The vision data can be based on the group of 3D data points or generated by an additional vision component of the robot. The vision data of block 554 can be based on the group of 3D data points in that the vision data and the group of 3D data points are both generated by the same vision component. For example, the group of 3D data points can be generated based on an instance of sensor output from multiple sensors of a stereographic camera, and the vision data applied at block 554 can be a 2D image that is based on the same instance from one or more of the sensors. In some implementations, the group of 3D data points can be based on a first vision component (e.g., a stereographic camera or a laser scanner) and the vision data of block 554 is a 2D image that is generated based on an additional vision component (e.g., a monographic camera).

At block 556, the system processes the vision data of block 554 using the trained machine learning model to generate output defining at least one grasp region and a corresponding semantic indication for the grasp region. In some implementations, when the vision data applied at block 554 is a 2D image, the output can define the grasp region as a plurality of pixels of the 2D image. In many situations, the output defines multiple grasp regions and a corresponding semantic indication for each grasp region. The semantic indications can vary among grasp regions, and/or can be the same for one or more of the grasp regions.

At block 558, the system selects, from a plurality of candidate grasp strategies and based on the semantic indication of the grasp region, a particular grasp strategy. For example, the semantic indication can indicate a grasp direction, a grasp type, a grasp force, and/or pre and/or post-grasp manipulations and, based on such indication, the selected particular grasp strategy can define such indicated grasp direction, a grasp type, a grasp force, and/or pre and/or post-grasp manipulations. In some implementations, where multiple grasp regions and semantic indications are generated at block 556, the system selects one of the grasp regions, and a corresponding semantic indication, based on the selected one of the grasp regions corresponding to a target object to be grasped.

At block 560, the system determines an end effector pose for interacting with the object to grasp the object based on: the group of 3D points, the grasp region, and the particular grasp strategy. In some implementations, block 560 includes sub-blocks 560A, 560B, and/or 560C.

At sub-block 560A, the system selects one or more particular 3D points within the grasp region. For example, the grasp region can define a plurality of pixels in vision data that is a two-dimensional (2D) image, and the system can select one or more particular 3D points based on those particular 3D point(s) being mapped to pixel(s) defined by the grasp region.

At sub-block 560B, the system determines a corresponding surface normal for each of one or more of the 3D points selected at sub-block 560A.

At sub-block 560C, the system determines an end effector pose based on one or more of the surface normal(s) determined at sub-block 560B. In some implementations, the system determines an end effector approach vector based on one or more of the surface normals, and determines a grasp pose based on the end effector approach vector. The grasp pose can further be determined based on it avoiding collisions, satisfying kinematic constraints, and/or based on other criterion/criteria. In some implementations, the particular grasp strategy defines a grasp direction, and the system determines a grasp pose based on a given surface normal, based on the given surface normal conforming to the grasp direction defined by the particular grasp strategy. In some additional or alternative implementations, the particular grasp strategy defines a grasp type, and the system determines a grasp pose based on the grasp end effector pose conforming to the grasp type (e.g., a "pinch" grasp pose when the grasp strategy defines a "pinch" grasp type).

At block 562, the system provides commands that cause the end effector of the robot to traverse to the end effector pose in association with attempting a grasp of the object. The system can optionally provide further commands, in association with attempting the grasp of the object, that are based on other features of the selected particular grasp strategy.

At optional block 564, the system stores the end effector pose and the vision data and/or the group of 3D points. The system stores the end effector pose and the vision data and/or the group of 3D points as at least part of a training instance used to train additional machine learning model(s) at optional block 566.

At optional block 566, the system trains additional machine learning model(s) based on stored instances of an end effector pose and vision data and/or a group of 3D points, including the instance stored at optional block 564, and additional instances stored at block 564 in additional iterations of method 500. For example, the stored instances can be training instances that each include corresponding vision data and/or corresponding 3D points as training instance input, and that include a corresponding end effector pose (e.g., a grasp pose) as training instance output. In this manner, an additional machine learning model can be trained that predicts an end effector pose (e.g., a grasp pose) directly based on vision data (e.g., a 2D image) and/or a group of 3D points.

Figure 6:
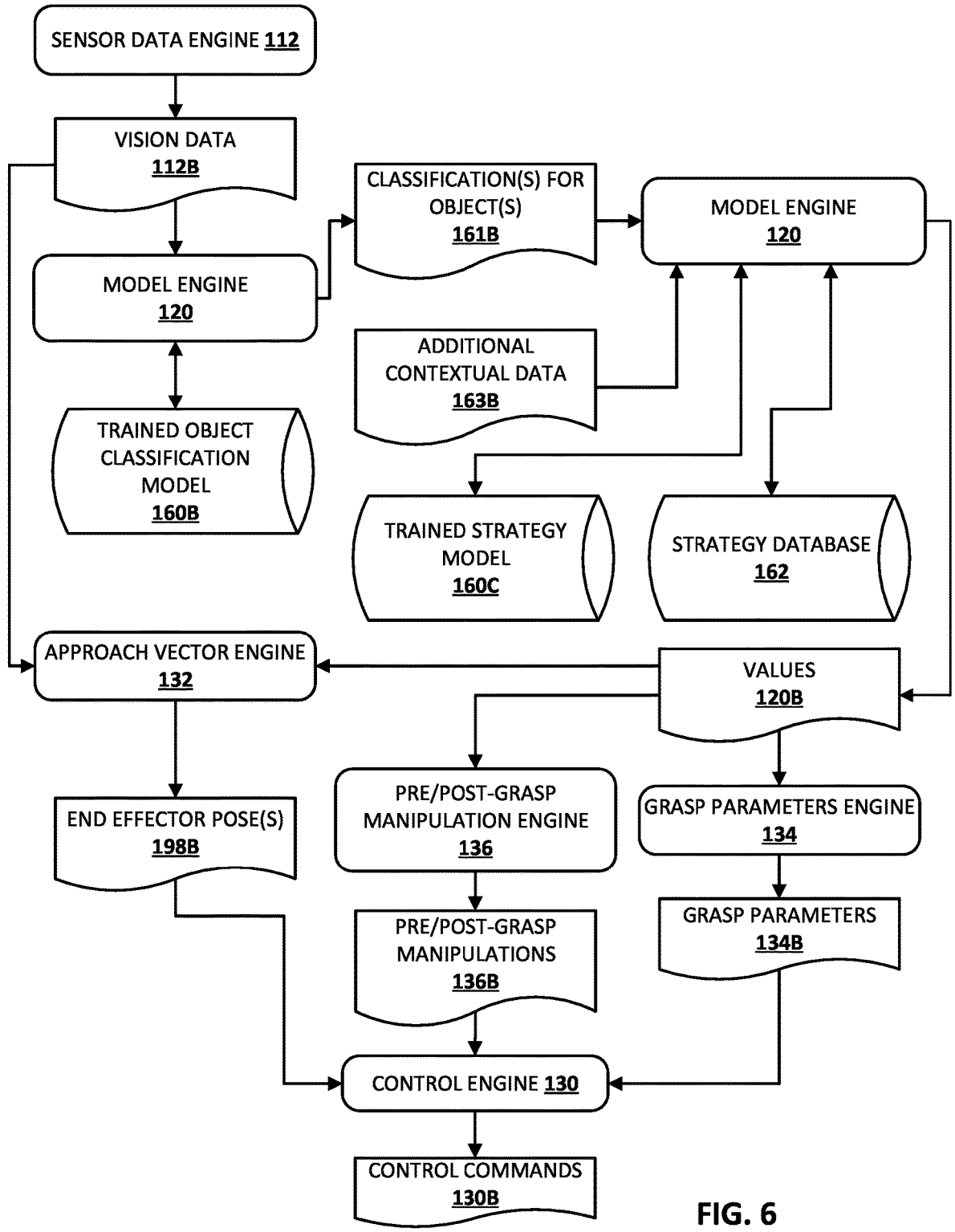
FIG. 6 is another example of generating control commands to provide to an end effector for grasping, based on a grasp strategy that is selected using one or more trained machine learning models.

FIG. 6 is another example of generating control commands to provide to an end effector for grasping, based on a grasp strategy that is selected using one or more trained machine learning models. It is noted that, in the example of FIG. 6, the grasp regions and semantic indications model 160A is not utilized. Rather, a trained object classification model 160B and optionally a trained strategy model 160C (e.g., trained as described with respect to FIG. 7) are utilized.

In FIG. 6, sensor data engine 112 provides vision data 112B to model engine 120 and to approach vector engine 132. The vision data 112B can include 3D vision data and/or 2D vision data from vision component(s) of a robot. The model engine 120 processes the vision data 112B using the trained object classification model 160B to generate one or more classifications for one or more objects 161 captured by the vision data. For example, the classification(s) for object(s) 161 can include classification(s) for an object to be grasped, and optionally classification(s) for additional environmental object(s). The classification(s) for the object to be grasped are a semantic indication associated with the object.

The model engine 120 utilizes the classification(s) for the object(s) 161, and optionally additional contextual data 163B, to select a grasp strategy and provides values 120B for the selected grasp strategy to the approach vector engine 132, the pre/post-grasp manipulation engine 136, and the grasp parameters engine 134. The additional contextual data 163B can include, for example, an indication of a higher level task (e.g., unloading a dishwasher, clearing a table, picking up toys) being performed by the robot, where an attempted grasp is one part of the higher level task. The additional contextual data 163B can additionally or alternatively include an indication of a location of the robot, such as "kitchen", "living room", "warehouse", "home", etc.

The model engine 120 selects a grasp strategy, and corresponding values 120B, using a trained strategy model 160C and/or using a strategy database 162. The trained strategy model 160C can be trained to be used to generate, based on classification(s) for object(s) 161B and optionally additional contextual data 163B, output that indicates a predicted grasp strategy. The model engine 120 can select a corresponding grasp strategy based on the output. For example, the output can indicate probabilities for each of one or more values of a grasp strategy, and the grasp strategy selected based on those value(s) having probabilities that satisfy threshold(s). For instance, the output can include a probability for each of a plurality of grasp directions, and the grasp direction with the highest probability selected. Also, for instance, the output can additionally or alternatively include a probability for each of a plurality of grasp types, and the grasp type with the highest probability selected. Also, for instance, the output can additionally or alternatively include a probability for each of a plurality of pre and/or post-grasp manipulations, and one or more of those optionally selected based on their probability. The model engine 120 can select a grasp strategy based at least in part on selection of corresponding value(s) based on probabilities. As another example, the output generated using the trained strategy model 160C can indicate probabilities for each of one or more grasp strategies, and one of the strategies selected based on the probabilities. For instance, the output can include a probability for "grasp strategy A" (e.g., "top" direction, "pinch" grasp type, no pre/post-grasp manipulations), a probability for "grasp strategy B" (e.g., "top direction", "power" grasp type, no pre/post-grasp manipulations), etc. Additional description of one example of training the trained strategy model 160C is described below with respect to FIG. 7.

The model engine 120 can additionally or alternatively select the grasp strategy based at least in part on a strategy database 162. The strategy database 162 can include stored mappings of classification(s) and/or additional contextual data to grasp strategies or value(s) for grasp strategies. For example, a "small plate" classification can be assigned, in the strategy database 162, to a value that dictates a "top grasp" is to be performed. As another example, a "large plate" classification can be assigned, in the strategy database 162, to a value that dictates a "side grasp" is to be performed following a pre-grasp manipulation of "slide to the edge of the supporting surface". The model engine 120 can select a grasp strategy based at least in part on the mappings of the strategy database 162.

The approach vector engine 132 uses the vision data 112B, and optionally one or more of the values 120B, to determine one or more end effector pose(s) 198 for interacting with an object to grasp the object. The approach vector engine 132 can generate an approach vector for a grasp, based on the vision data 112B, and generate the one or more end effector poses 198B based on the approach vector, such as an end effector grasp pose that conforms to the end effector approach vector and that avoids collisions and satisfies kinematic constraints. Various techniques can be utilized by the approach vector engine 132, such as using surface normals of 3D points corresponding to an object, and/or alternative techniques (e.g., using a stored object model for the object to be grasped). In some implementations, the approach vector engine 132 determines an approach vector and/or an end effector pose based on a grasp direction and/or grasp type defined by one or more of the values 120B.

The grasp parameters engine 134 can generate the grasp parameters 134B based on grasp parameters (e.g., grasp type and/or grasp force) defined by one or more of the values 120B. The pre/post-grasp manipulation engine 136 can generate the pre/post-grasp manipulation(s) 136B based on pre and/or post-grasp manipulation(s) defined by the value(s) 120B.

The end effector poses(s) 198B, grasp parameters 134B, and pre/post-grasp manipulations 136B are provided to the control engine 130, which generates control commands 130B based on such data, that control an end effector to cause the end effector to interact with the target object in attempting a grasp of the object. Accordingly, in FIG. 6 the control engine 130 generates control commands 130B that are in accordance with a selected grasp strategy.

Figure 7:
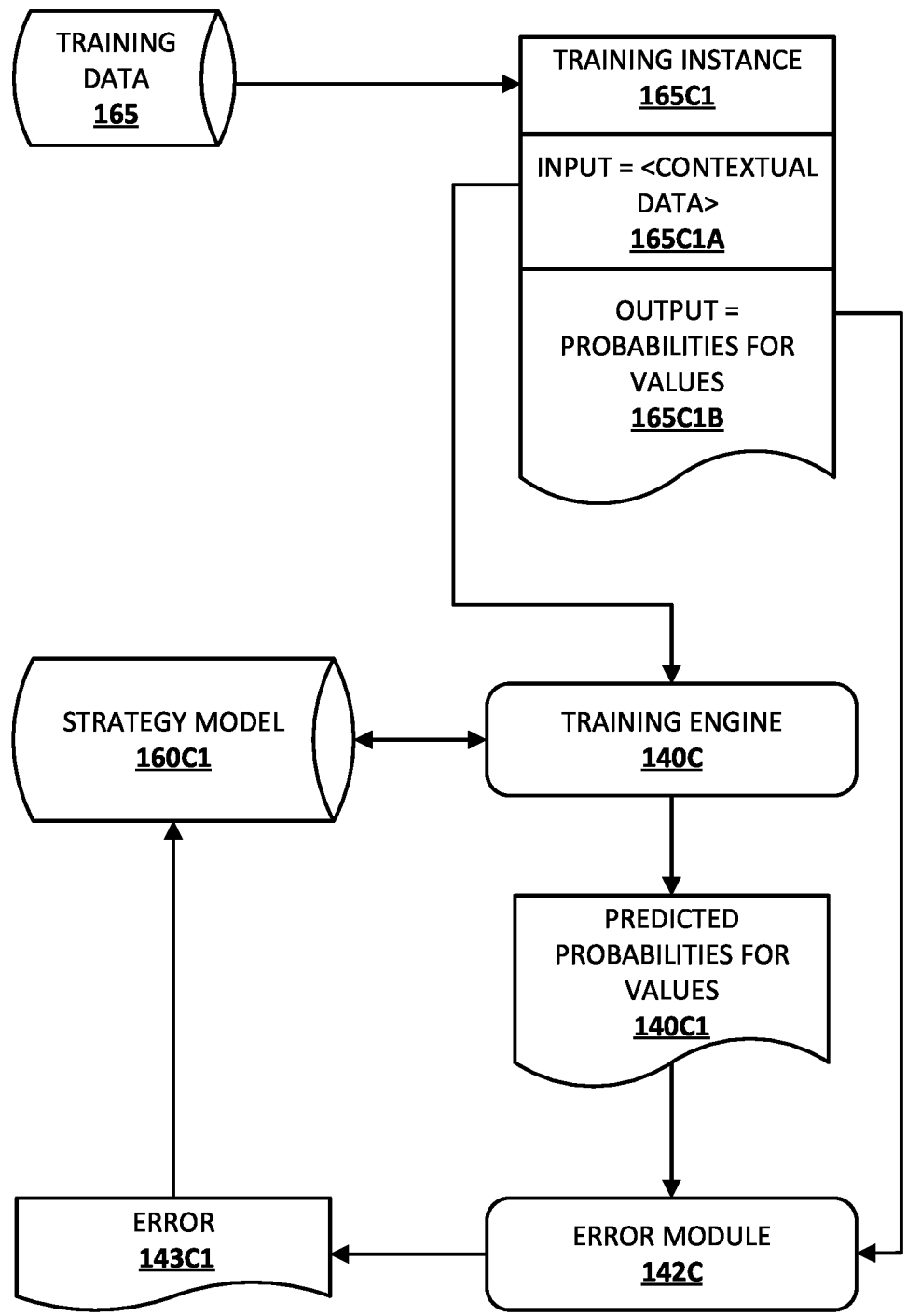
FIG. 7 illustrates an example of training a trained grasp strategy model, of the trained machine learning models of FIG. 6.

FIG. 7 illustrates an example of training the trained grasp strategy model 160C, of the trained machine learning models of FIG. 6. In FIG. 7, the grasp strategy model is numbered with 160C1 to represent that it is being trained, whereas it is numbered with 160C in FIG. 6 to represent that is has been trained.

The grasp strategy model 160C1 is trained utilizing a plurality of training instances of training data 165, such as training instance 165C1 and additional (e.g., thousands of) similar training instances. A single training instance 165C1 is illustrated in FIG. 7 and includes training instance input 165C1A of classification(s) and/or contextual data and includes training instance output 165C1B that indicates probabilities for each of a plurality of values of a grasping strategy. The training engine 140C applies the training instance input 165C1B as input to the grasp strategy model 160C1, and processes the input using the strategy model 160C1 to generate predicted probabilities for values of a grasping strategy 140C1.

An error module 142C, of the training engine 140C, generates an error 143C1 based on comparing the predicted probabilities for values of a grasping strategy 140C1 to the probabilities for values of a grasping strategy indicated by the training instance output 165C1B. The error module 142C further updates the grasp strategy model 160C1 based on the determined error 143C1. For example, in non-batch techniques, a gradient can be determined based on only the error 143C1, and backpropagated over the model 160C1 to update various weights of the model 160C1. Also, for example, in batch techniques, the error 143C1 can be combined with additional errors determined based on additional training instances, and utilized to update various weights of the model 160C1. Although only the training instance 165C1 is illustrated in FIG. 7, it is understood that many (e.g., thousands) of additional training instances will be utilized during training. Through training, the grasp strategy model 160C1 is trained to enable prediction, using the model 160C1 and based on classification(s) and/or contextual data, of values for a grasp strategy.

In various implementations, the strategy model 160C1 is a deep neural network model, such as a feed-forward deep neural network model. In various implementations, the training instance 165C1 and other training instances utilized to train the strategy model 160C1 are semi-supervised training instances generated based on actual grasp attempts by robots. For example, the classification(s) and/or contextual data of the training instance input 165C1A can be based on corresponding data determined by a robot in association with a grasp attempt. Further, the probabilities of the training instance output 165C1B can be "1" (or other positive value) for those value(s) utilized in performing the grasp attempt, when the grasp attempt was successful.

Figure 8:
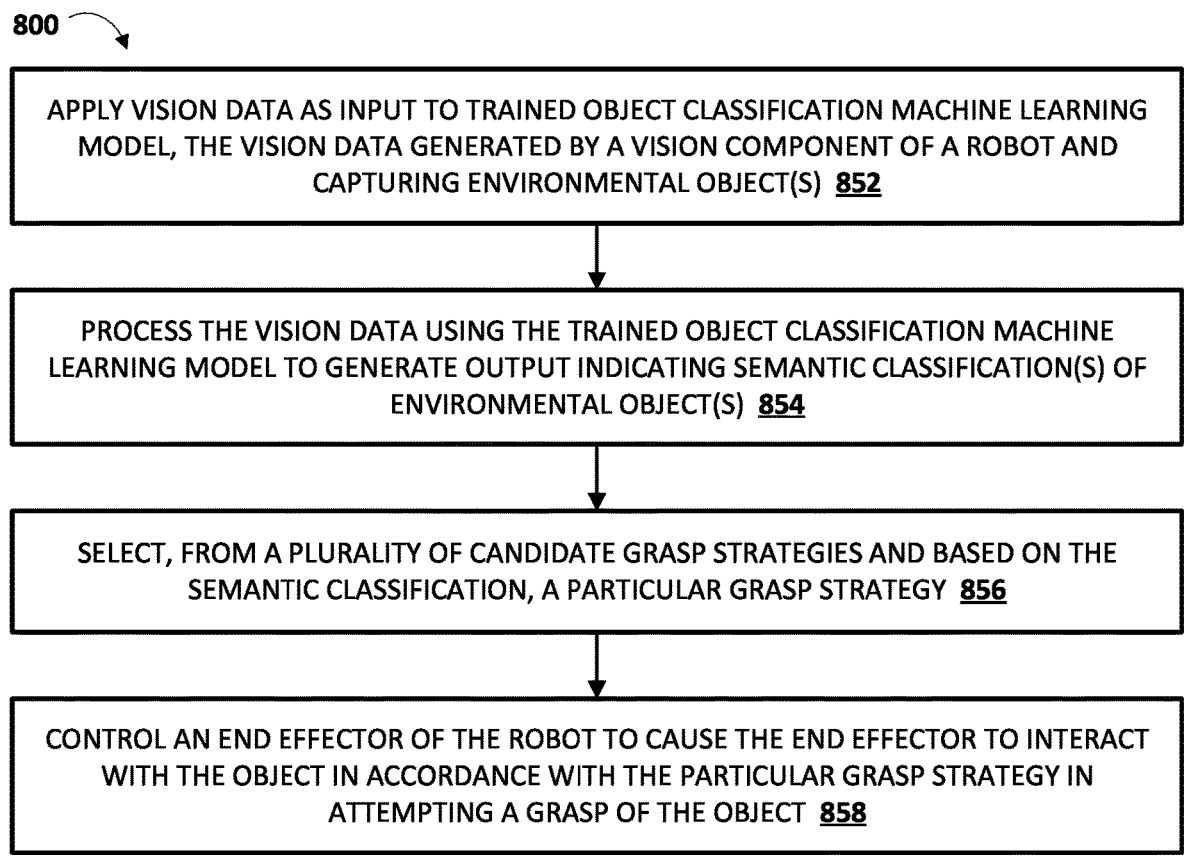
FIG. 8 is a flowchart illustrating an example method of controlling an end effector a robot in accordance with a selected grasp strategy.

Turning now to FIG. 8, a flowchart is provided that illustrates another example method 800 of controlling an end effector a robot in accordance with a selected grasp strategy, according to various implementations disclosed herein. For convenience, the operations of the flow chart are described with reference to a system that performs the operations. This system may include one or more components, such as one or more processors (e.g., CPU(s), GPU(s), and/or TPU(s)) of a robot. While operations of method 800 are shown in a particular order, this is not meant to be limiting. One or more operations may be reordered, omitted or added.

At block 852, the system applies vision data as input to a trained object classification machine learning model. The vision data can be generated by a vision component of a robot and captures an environmental object to be grasped, and optionally additional environmental object(s). The vision data can be 2D and/or 3D vision data.

At block 854, the system processes the vision data using the trained object classification model to generate output indicating semantic classification(s) of the environmental object(s). For example, one or more classifications can be generated for the environmental object to be grasped, and optionally one or more corresponding classifications can be generated for each of one or more other environmental object(s).

At block 856, the system selects, from a plurality of candidate grasp strategies and based on the semantic classification(s), a particular grasp strategy. For example, the system can select a particular grasp strategy using a strategy machine learning model and/or a strategy database, as described herein. In some implementations, the system selects the particular grasp strategy further based on additional contextual data as described herein.

At block 858, the system controls an end effector of the robot to cause the end effector to interact with the object in accordance with the particular grasp strategy in attempting a grasp of the object.

Figure 9:
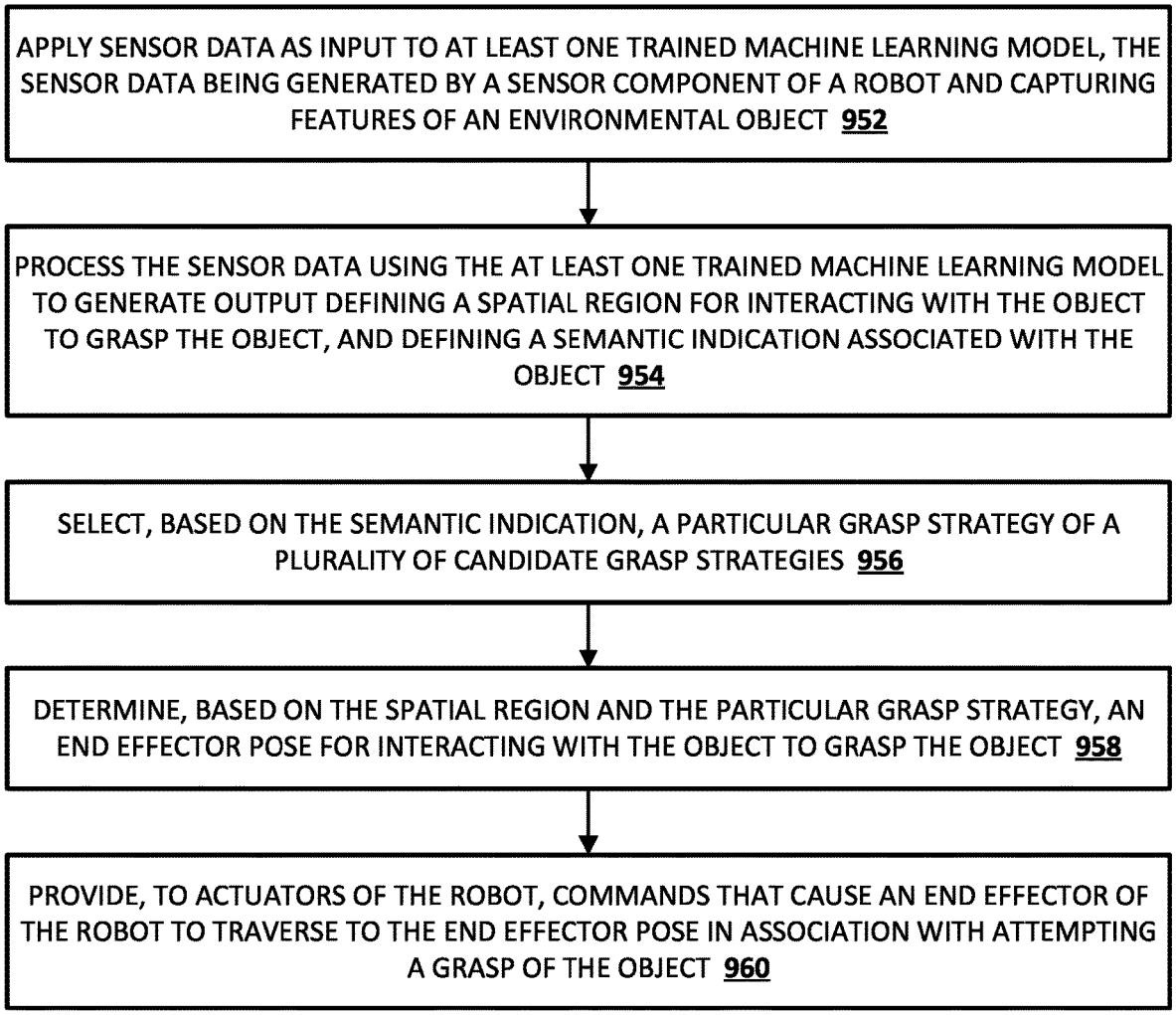
FIG. 9 is a flowchart illustrating another example method of providing control commands to cause an end effector to traverse to an end effector pose determined based on a selected grasp strategy.

Turning now to FIG. 9, a flowchart is provided that illustrates another example method 900 of providing control commands to cause an end effector to traverse to an end effector pose determined based on a selected grasp strategy, according to various implementations disclosed herein. For convenience, the operations of the flow chart are described with reference to a system that performs the operations. This system may include one or more components, such as one or more processors (e.g., CPU(s), GPU(s), and/or TPU(s)) of a robot. While operations of method 900 are shown in a particular order, this is not meant to be limiting. One or more operations may be reordered, omitted or added.

At block 952, the system applies sensor data as input to at least one trained machine learning model. The sensor data is generated by sensor component(s) of a robot and captures features of an environmental object to be grasped. The sensor data can include, for example, vision data (e.g., 2D and/or 3D vision data) generated by vision component(s) of the robot (e.g., camera(s) and/or laser scanner)

At block 954, the system processes the sensor data using the at least one trained machine learning model to generate output defining a spatial region for interacting with the object to grasp the object, and defining a semantic indication associated with the object. For example, the system can process the sensor data using a trained grasp regions and semantic indications model described herein, to generate output defining a grasp region and a semantic indication that directly indicates a grasp direction, grasp type, and/or pre/post-grasp manipulation(s). Also, for example, the system can additionally or alternatively process the sensor data using a trained object classification model described herein, to generate output defining a spatial region for the object (the entire object, not "grasp" regions), and a classification for the object.

At block 956, the system selects, based on the semantic indication, a particular grasp strategy of a plurality of candidate grasp strategies. For example, the system can select a particular grasp strategy based on it being indicated, in output generated using the trained grasp regions and semantic indications model, by a semantic indication for a grasp region that corresponds to an object to be grasped. Also, for example, the system can select a particular grasp strategy based on it being mapped, in a strategy database, to classification(s) generated using the trained object classification model and/or to additional contextual data. Also, for example, the system can select a particular grasp strategy based on the grasp strategy being indicated by output generated using a trained grasp strategy model, based on processing (using the trained grasp strategy model) of classification(s) generated using the trained object classification model and/or of additional contextual data.

At block 958, the system determines, based on the spatial region and the particular grasp strategy, an end effector pose for interacting with the object to grasp the object.

At block 960, the system provides, to actuators of the robot, commands that cause an end effector of the robot to traverse to the end effector pose in association with attempting a grasp of the object.

Figure 12:
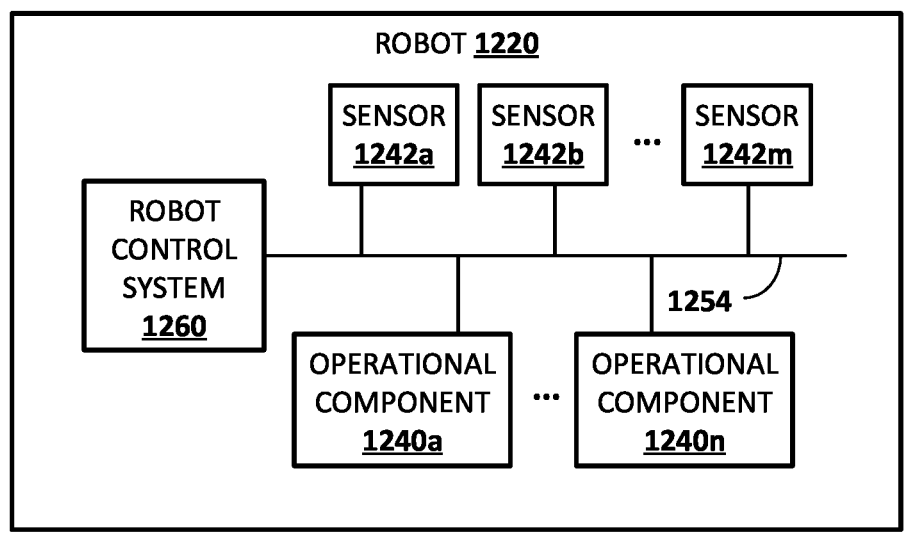
FIG. 12 schematically depicts an example architecture of a robot.

Turning now to FIG. 12, an example architecture of a robot 1220 is schematically depicted. The robot 1220 includes a robot control system 1260, one or more operational components 1240a-1240n, and one or more sensors 1242a-1242m. The sensors 1242a-1242m may include, for example, vision sensors (e.g., camera(s), 3D scanners), light sensors, pressure sensors, pressure wave sensors (e.g., microphones), proximity sensors, accelerometers, gyroscopes, thermometers, barometers, and so forth. While sensors 1242a-m are depicted as being integral with robot 1220, this is not meant to be limiting. In some implementations, sensors 1242a-m may be located external to robot 1220, e.g., as standalone units.

Operational components 1240a-1240n may include, for example, one or more end effectors (e.g., grasping end effectors) and/or one or more servo motors or other actuators to effectuate movement of one or more components of the robot. For example, the robot 1220 may have multiple degrees of freedom and each of the actuators may control actuation of the robot 1220 within one or more of the degrees of freedom responsive to the control commands. As used herein, the term actuator encompasses a mechanical or electrical device that creates motion (e.g., a motor), in addition to any driver(s) that may be associated with the actuator and that translate received control commands into one or more signals for driving the actuator. Accordingly, providing a control command to an actuator may comprise providing the control command to a driver that translates the control command into appropriate signals for driving an electrical or mechanical device to create desired motion.

The robot control system 1260 may be implemented in one or more processors, such as a CPU, GPU, and/or other controller(s) of the robot 1220. In some implementations, the robot 1220 may comprise a "brain box" that may include all or aspects of the control system 1260. For example, the brain box may provide real time bursts of data to the operational components 1240a-n, with each of the real time bursts comprising a set of one or more control commands that dictate, inter alia, the parameters of motion (if any) for each of one or more of the operational components 1240a-n. In some implementations, the robot control system 1260 may perform one or more aspects of method 500, method 800, and/or method 900 described herein.

As described herein, in some implementations all or aspects of the control commands generated by control system 1260 in positioning an end effector to grasp an object may be based on control commands generated in accordance with a grasp strategy. Although control system 1260 is illustrated in FIG. 12 as an integral part of the robot 1220, in some implementations, all or aspects of the control system 1260 may be implemented in a component that is separate from, but in communication with, robot 1220. For example, all or aspects of control system 1260 may be implemented on one or more computing devices that are in wired and/or wireless communication with the robot 1220, such as computing device 1310.

Figure 13:
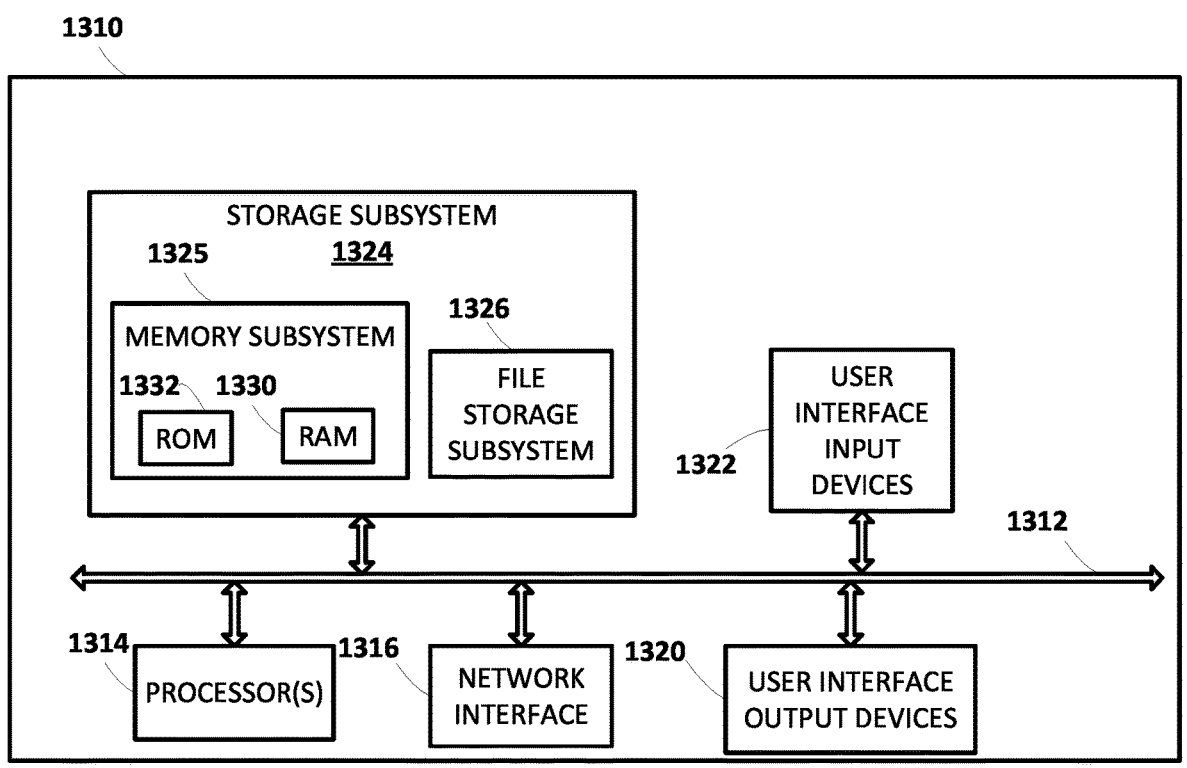
FIG. 13 schematically depicts an example architecture of a computer system.

FIG. 13 is a block diagram of an example computing device 1310 that may optionally be utilized to perform one or more aspects of techniques described herein. Computing device 1310 typically includes at least one processor 1314 which communicates with a number of peripheral devices via bus subsystem 1312. These peripheral devices may include a storage subsystem 1324, including, for example, a memory subsystem 1325 and a file storage subsystem 1326, user interface output devices 1320, user interface input devices 1322, and a network interface subsystem 1316. The input and output devices allow user interaction with computing device 1310. Network interface subsystem 1316 provides an interface to outside networks and is coupled to corresponding interface devices in other computing devices.

User interface input devices 1322 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 1310 or onto a communication network.

User interface output devices 1320 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 1310 to the user or to another machine or computing device.

Storage subsystem 1324 stores programming and data constructs that provide the functionality of some or all of the modules described herein. For example, the storage subsystem 1324 may include the logic to perform selected aspects of the method of FIG. 5, the method of FIG. 8, and/or the method of FIG. 9.

These software modules are generally executed by processor 1314 alone or in combination with other processors. Memory 1325 used in the storage subsystem 1324 can include a number of memories including a main random access memory (RAM) 1330 for storage of instructions and data during program execution and a read only memory (ROM) 1332 in which fixed instructions are stored. A file storage subsystem 1326 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 1326 in the storage subsystem 1324, or in other machines accessible by the processor(s) 1314.

Bus subsystem 1312 provides a mechanism for letting the various components and subsystems of computing device 1310 communicate with each other as intended. Although bus subsystem 1312 is shown schematically as a single bus, alternative implementations of the bus subsystem may use multiple busses.

Computing device 1310 can be of varying types including a workstation, server, computing cluster, blade server, server farm, or any other data processing system or computing device. Due to the ever-changing nature of computers and networks, the description of computing device 1310 depicted in FIG. 13 is intended only as a specific example for purposes of illustrating some implementations. Many other configurations of computing device 1310 are possible having more or fewer components than the computing device depicted in FIG. 13.

What is claimed is:

1. A method implemented by one or more processors, comprising:

receiving a group of three-dimensional (3D) data points generated by a vision component of a robot, the group of 3D data points capturing an object in an environment of a robot;

applying vision data as input to at least one trained machine learning model, the vision data being based on the group of 3D data points, or being generated by an additional vision component of the robot, the vision data capturing the object in the environment of the robot;

processing the vision data using the trained machine learning model to generate output defining one or more grasp regions and, for each of the one or more grasp regions, a corresponding semantic indication;

selecting a grasp region, of the one or more grasp regions, based on the grasp region corresponding to the object and the object being selected for grasping;

selecting, based on the semantic indication of the grasp region, a particular grasp strategy from a plurality of candidate grasp strategies defined for an end effector of the robot;

determining an end effector pose for interacting with the object to grasp the object, wherein determining the end effector pose comprises:

selecting, from the group of 3D points, at least a first 3D point and a second 3D point, based on the first 3D point and the second 3D point being within the grasp region defined by the output generated by processing the vision data using the trained machine learning model;

selecting a first surface normal, that is determined based on the first 3D point, in lieu of a second surface normal, that is determined based on the second 3D point, wherein selecting the first surface normal is based on the first surface normal conforming to a grasp approach direction defined by the particular grasp strategy that is selected based on the semantic indication of the grasp region, that is defined by the output generated using the trained machine learning model; and in response to selecting the first surface normal, determining the end effector pose based on the first surface normal; and providing, to actuators of the robot, commands that cause the end effector of the robot to traverse to the end effector pose in association with attempting a grasp of the object.

2. The method of claim 1, wherein the vision data processed using the trained machine learning model to generate the output comprises two-dimensional (2D) vision data.

3. The method of claim 1, wherein the particular grasp strategy further defines a degree of force to apply in attempting the grasp of the object.

4. The method of claim 3, wherein the particular grasp strategy further defines a grasp type to be performed by the end effector.

5. The method of claim 1, wherein the particular grasp strategy further defines a grasp type to be performed by the end effector.

6. The method of claim 1, wherein the output is generated over a single model of the at least one trained machine learning model.

7. The method of claim 6, wherein the vision data lacks a depth channel.

8. The method of claim 7, wherein the vision data processed using the single model comprises the group of 3D points without the depth channel.

9. A robot, comprising:
actuators;
a vision component;
an end effector;
memory storing instructions;
one or more processors, executing the instructions, to cause the one or more processors to:
receive a group of three-dimensional (3D) data points generated by the vision component, the group of 3D data points capturing an object in an environment of a robot;
apply vision data as input to at least one trained machine learning model, the vision data being based on the group of 3D data points, or being generated by an additional vision component of the robot, the vision data capturing the object in the environment of the robot;
process the vision data using the trained machine learning model to generate output defining one or more grasp regions and, for each of the one or more grasp regions, a corresponding semantic indication;
select a grasp region, of the one or more grasp regions, based on the grasp region corresponding to the object and the object being selected for grasping;
select, based on the semantic indication of the grasp region, a particular grasp strategy from a plurality of candidate grasp strategies defined for the end effector;
determine an end effector pose for interacting with the object to grasp the object, wherein in determining the end effector pose one or more of the processors are to:
select, from the group of 3D points, at least a first 3D point and a second 3D point, based on the first 3D point and the second 3D point being within the grasp region defined by the output generated by processing the vision data using the trained machine learning model;
select a first surface normal, that is determined based on the first 3D point, in lieu of a second surface normal, that is determined based on the second 3D point,
wherein selecting the first surface normal is based on the first surface normal conforming to a grasp approach direction defined by the particular grasp strategy that is selected based on the semantic indication of the grasp region, that is defined by the output generated using the trained machine learning model; and
in response to selecting the first surface normal, determine the end effector pose based on the first surface normal; and provide, to the actuators of the robot, commands that cause the end effector of the robot to traverse to the end effector pose in association with attempting a grasp of the object.

10. The robot of claim 9, wherein the vision data processed using the trained machine learning model to generate the output comprises two-dimensional (2D) vision data.

11. The robot of claim 9, wherein the particular grasp strategy further defines a degree of force to apply in attempting the grasp of the object.

12. The robot of claim 11, wherein the particular grasp strategy further defines a grasp type to be performed by the end effector.

13. The robot of claim 9, wherein the particular grasp strategy further defines a grasp type to be performed by the end effector.

14. The robot of claim 9, wherein the output is generated over a single locally stored model of the at least one trained machine learning model.

15. The robot of claim 14, wherein the vision data lacks a depth channel.

16. The robot of claim 15, wherein the vision data processed using the single model comprises the group of 3D points without the depth channel.

17. A non-transitory computer readable storage medium storing instructions executable by a processor to perform a method, the method comprising:
receiving a group of three-dimensional (3D) data points generated by a vision component of a robot, the group of 3D data points capturing an object in an environment of a robot;
applying vision data as input to at least one trained machine learning model, the vision data being based on the group of 3D data points, or being generated by an additional vision component of the robot, the vision data capturing the object in the environment of the robot;
processing the vision data using the trained machine learning model to generate output defining one or more grasp regions and, for each of the one or more grasp regions, a corresponding semantic indication;
selecting a grasp region, of the one or more grasp regions, based on the grasp region corresponding to the object and the object being selected for grasping;
selecting, based on the semantic indication of the grasp region, a particular grasp strategy from a plurality of candidate grasp strategies defined for an end effector of the robot;
determining an end effector pose for interacting with the object to grasp the object, wherein determining the end effector pose comprises:
selecting, from the group of 3D points, at least a first 3D point and a second 3D point, based on the first 3D point and the second 3D point being within the grasp region defined by the output generated by processing the vision data using the trained machine learning model;
selecting a first surface normal, that is determined based on the first 3D point, in lieu of a second surface normal, that is determined based on the second 3D point,
wherein selecting the first surface normal is based on the first surface normal conforming to a grasp approach direction defined by the particular grasp strategy that is selected based on the semantic indication of the grasp region, that is defined by the output generated using the trained machine learning model; and in response to selecting the first surface normal, determining the end effector pose based on the first surface normal; and providing, to actuators of the robot, commands that cause an end effector of the robot to traverse to the end effector pose in association with attempting a grasp of the object.

\* \* \* \* \*